(12) United States Patent
Uenishi et al.

(10) Patent No.: US 9,103,259 B2
(45) Date of Patent: Aug. 11, 2015

(54) EXHAUST PURIFICATION SYSTEM OF INTERNAL COMBUSTION ENGINE

(75) Inventors: Toru Uenishi, Susono (JP); Mikio Inoue, Susono (JP); Kohei Yoshida, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1 day.

(21) Appl. No.: 13/582,862

(22) PCT Filed: Feb. 7, 2012

(86) PCT No.: PCT/JP2012/052732
§ 371 (c)(1),
(2), (4) Date: Sep. 5, 2012

(87) PCT Pub. No.: WO2013/118254
PCT Pub. Date: Aug. 15, 2013

(65) Prior Publication Data
US 2013/0202491 A1      Aug. 8, 2013

(51) Int. Cl.
*F01N 3/00*   (2006.01)
*F01N 3/20*   (2006.01)
*F01N 3/08*   (2006.01)

(52) U.S. Cl.
CPC *F01N 3/206* (2013.01); *F01N 3/08* (2013.01); *F01N 3/2066* (2013.01); *F01N 2610/03* (2013.01)
USPC ............... 60/286; 60/295; 60/297; 60/301; 60/303

(58) Field of Classification Search
CPC .................................................. F01N 2610/03
USPC ................... 60/286, 295, 297, 299, 301, 303
See application file for complete search history.

(56) References Cited

U.S. PATENT DOCUMENTS

| 5,052,178 A | 10/1991 | Clerc et al. |
| 5,057,483 A | 10/1991 | Wan |

(Continued)

FOREIGN PATENT DOCUMENTS

| CN | 101454081 A | 6/2009 |
| CN | 101600860 A | 12/2009 |

(Continued)

OTHER PUBLICATIONS

U.S. Appl. No. 13/375,674, filed Dec. 1, 2011 in the name of Inoue et al.

(Continued)

*Primary Examiner* — Binh Q Tran
(74) *Attorney, Agent, or Firm* — Oliff PLC

(57) ABSTRACT

An exhaust purification system of an internal combustion engine is provided with a hydrocarbon feed valve arranged in an engine exhaust passage and an exhaust purification catalyst for causing $NO_X$ contained in exhaust gas and reformed hydrocarbons to react. The exhaust purification catalyst reduces $NO_X$ if a concentration of inflowing hydrocarbons vibrates within a predetermined range of amplitude and within a predetermined range of period and increases the amount of storage of $NO_X$ if the vibration period of the concentration of hydrocarbons longer is than a predetermined range. When hydrocarbons are being fed from the hydrocarbon feed valve within the predetermined range of amplitude and the predetermined range of period, if the amount of adsorption of hydrocarbons in the exhaust purification catalyst exceeds a predetermined judgment value of the adsorption amount, at least one of reducing amount of feed of hydrocarbons and lengthening feed interval of hydrocarbons is performed.

4 Claims, 21 Drawing Sheets

(56) References Cited

U.S. PATENT DOCUMENTS

| | | | |
|---|---|---|---|
| 5,075,274 | A | 12/1991 | Kiyohide et al. |
| 5,402,641 | A | 4/1995 | Katoh et al. |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 | 2/2005 | Elwart et al. |
| 6,877,311 | B2 | 4/2005 | Uchida |
| 6,983,589 | B2 | 1/2006 | Lewis et al. |
| 7,063,642 | B1 * | 6/2006 | Hu et al. ............. 477/100 |
| 7,073,325 | B2 | 7/2006 | Nakatani et al. |
| 7,082,753 | B2 | 8/2006 | Dalla Betta et al. |
| 7,111,456 | B2 | 9/2006 | Yoshida et al. |
| 7,137,379 | B2 | 11/2006 | Sasaki et al. |
| 7,146,800 | B2 | 12/2006 | Toshioka et al. |
| 7,165,393 | B2 | 1/2007 | Betta et al. |
| 7,299,625 | B2 * | 11/2007 | Uchida et al. ........... 60/277 |
| 7,332,135 | B2 | 2/2008 | Gandhi et al. |
| 7,412,823 | B2 | 8/2008 | Reuter et al. |
| 7,454,900 | B2 | 11/2008 | Hayashi |
| 7,484,504 | B2 | 2/2009 | Kato et al. |
| 7,506,502 | B2 * | 3/2009 | Nakano et al. ........... 60/285 |
| 7,549,284 | B2 | 6/2009 | Iihoshi et al. |
| 7,703,275 | B2 | 4/2010 | Asanuma et al. |
| 7,707,821 | B1 * | 5/2010 | Legare .................. 60/277 |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 * | 9/2012 | Fukuda et al. ........... 60/285 |
| 8,281,569 | B2 | 10/2012 | Handa et al. |
| 8,434,296 | B2 * | 5/2013 | Wada et al. ........... 60/285 |
| 8,572,950 | B2 | 11/2013 | Bisaiji et al. |
| 8,656,706 | B2 * | 2/2014 | Umemoto et al. ........... 60/295 |
| 8,671,667 | B2 | 3/2014 | Bisaiji et al. |
| 8,679,410 | B2 * | 3/2014 | Umemoto et al. ........... 422/170 |
| 8,689,543 | B2 * | 4/2014 | Numata et al. ........... 60/286 |
| 8,695,325 | B2 | 4/2014 | Bisaiji et al. |
| 2001/0052232 | A1 | 12/2001 | Hoffmann et al. |
| 2002/0029564 | A1 | 3/2002 | Roth et al. |
| 2002/0053202 | A1 | 5/2002 | Akama et al. |
| 2003/0010020 | A1 | 1/2003 | Taga et al. |
| 2003/0040432 | A1 | 2/2003 | Beall et al. |
| 2003/0101713 | A1 | 6/2003 | Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 | 5/2006 | Bernler et al. |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 | 6/2007 | Reuter et al. |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 | 4/2009 | Tsujimoto et al. |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 | 9/2010 | Kumar et al. |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Andersen et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1544429 A1 | 6/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |
| JP | A-09-220440 | 8/1997 |
| JP | A-11-30117 | 2/1999 |
| JP | A-11-62559 | 3/1999 |
| JP | A-11-081994 | 3/1999 |
| JP | A-2000-257419 | 9/2000 |
| JP | A-2002-188429 | 7/2002 |
| JP | A-2004-016850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |

(56) References Cited

FOREIGN PATENT DOCUMENTS

| | | |
|---|---|---|
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 | 1/2008 |
| WO | WO 2009/016822 | 2/2009 |
| WO | WO 2009/056958 | 5/2009 |
| WO | WO 2009/082035 | 7/2009 |
| WO | WO2011/114499 * 9/2011 ............ 60/286 | |
| WO | WO 2011/114499 A1 | 9/2011 |
| WO | WO 2011/114501 A1 | 9/2011 |
| WO | WO 2011/118044 A1 | 9/2011 |

OTHER PUBLICATIONS

U.S. Appl. No. 13/264,594, filed Oct. 14, 2011 in the name of Inoue et al.
Office Action dated May 8, 2014 issued in U.S. Appl. No. 13/375,674.
Jun. 19, 2014 Office Action issued in U.S. Appl. No. 13/264,594.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Feb. 6, 2014 Corrected Notice of Allowability issued in U.S. Appl. No. 13/202,694.
Dec. 21, 2010 International Search Report issued in International Patent Application No. PCT/JP2010/065449 (with translation).
Dec. 27, 2011 International Search Report issued in International Patent Application No. PCT/JP2011/075618 (with translation).
Jun. 15, 2010 International Search Report issued in International Patent Application No. PCT/JP2010/054730 (with translation).
Nov. 22, 2010 International Search Report issued in International Patent Application No. PCT/JP2010/065186 (with translation).
Jan. 18, 2011 International Search Report issued in International Patent Application No. PCT/JP2010/067705.
Jan. 18, 2011 International Search Report issued in International Application No. PCT/JP2010/067707.
Jan. 18, 2011 International Search Report Issued in International Patent Application No. PCT/JP2010/068785.
Jul. 14, 2014 Office Action issued In U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 21, 2011 International Search Report issued in International Patent Application No. PCT/JP2011/059880 (with translation).
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303.
Mar. 15, 2011 International Search Report issued in International Patent Application No. PCT/JP2011/053429.
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264.
May 2, 2014 Office Action issued in U.S. Appl. No. 13/263,660.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2010 International Search Report issued in International Patent Application No. PCT/JP2010/063135.
Oct. 26, 2012 Office Action issued in U.S. Appl. No. 13/202,692.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
Jul. 24, 2013 Office Action issued in U.S. Appl. No. 13/202,692.
May 7, 2014 Office Action issued in U.S. Appl. No. 13/264,062.
U.S. Appl. No. 13/202,692 in the name of Umemoto et al., file Sep. 20, 2011.
U.S. Appl. No. 13/202,733 in the name of Bisaui et al., filed Sep. 30, 2011.
U.S. Appl. No. 13/257,789 in the name of Nishioka et al., filed Oct. 14, 2011.
U.S. Appl. No. 13/258,483 in the name of Numata et al., filed Sep. 22, 2011.
U.S. Appl. No. 13/259,574 in the name Tsukamoto et al., filed Sep. 23, 2011.
U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/262,858 in the name of Bisaiji et al., filed Oct. 4, 2011.
U.S. Appl. No. 13/263,272 in the name of Bisaiji et al., filed Oct. 6, 2011.
U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,230 in the name of Bisadi et al., filed Oct. 13, 2011.
U.S. Appl. No. 13/264,884 in the name of Bisaiji et al., filed Oct. 17, 2011.
U.S. Appl. No. 13/578,148 in the name of Umemoto et al., filed Aug. 9, 2012.
U.S. Appl. No. 13/58,186 in the name of Kazuhiro Umemoto et al., filed Aug. 24, 2012.

(56) References Cited

OTHER PUBLICATIONS

U.S. Appl. No. 13/580,000 in the name of Bisaiji et al., filed Aug. 20, 2012.
U.S. Appl. No. 13/582,909 in the name of Kazuhiro Umemoto et al., filed Sep. 5, 2012.
U.S. Appl. No. 131202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion issued in International Patent Application No. PCT/JP2010/065186 (with translation).
Dec. 27, 2011 Written Opinion issued in International Patent Application No. PCT/JP2011/075618.
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/054740 (with translation).
Jun. 15, 2010 Written Opinion issued in PCT/JP2010/054740 (with translation).
Jun. 20, 2012 Search Report issued in European Patent Application No. 10845966.0.
Jun. 15, 2010 International Search Report issued in International Application No. PCT/JP2010/054731 (with translation).
Jun. 29, 2010 International Search Report issued in International Patent Application No. PCT/JP2010/056345.
Apr. 4, 2013 Office Action issued in U.S. Appl. No. 13/255,710.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
Oct. 24, 2013 Office Action issued in U.S. Appl. No. 13/255,710.
Jan. 17, 2013 Office Action issued in U.S. Appl. No. 13/202,733.
International Search Report dated Jun. 15, 2010 in International Application No. PCT/JP2010/054729.
International Search Report issued in International Application No. PCT/JP2011/066628 dated Sep. 13, 2011 (with Translation).
U.S. Appl. No. 13/502,210 in the name of Bisaiji et al., filed Apr. 16, 2012.
U.S. Appl. No. 13/499,211 in the name of Bisaiji et al., filed Mar. 29, 2012.
Jan. 22, 2014 Office Action issued in U.S. Appl. No. 13/499,211.
May 27, 2014 Office Action issued in U.S. Appl. No. 13/255,710.
Sep. 18, 2014 Notice of Allowance issued in U.S. Appl. No. 13/255,710.
U.S. Appl. No. 13/934,080 in the name of Bisaiji et al., filed Jul. 2, 2013.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/262,506 in the name of Bisaiji et al., filed Sep. 30, 2011.
U.S. Appl. No. 13/264,230 in the name of Bisaiji et al., filed Oct. 13, 2011.
U.S. Appl. No. 13/202,694 in the name of Bisaiji et al., filed Sep. 19, 2011.
U.S. Appl. No. 13/202,733 in the name of Bisaiji et al., filed Sep. 30, 2011.
Dec. 22, 2014 Office Action issued in U.S. Appl. No. 13/264,230.
Jun. 3, 2015 Office Action issued in U.S. Appl. No. 14/152,629.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

The exhaust of diesel engines, gasoline engines, and other internal combustion engines includes, for example, carbon monoxide (CO), unburned fuel comprised of hydrocarbons (HC), nitrogen oxides ($NO_X$), particulate matter (PM), and other constituents. As devices for removing $NO_X$, a reduction catalyst which continuously reduces the $NO_X$ which is contained in exhaust by the feed of a reducing agent to the exhaust purification catalyst or an $NO_X$ storage catalyst which stores $NO_X$ when the exhaust gas is lean in air-fuel ratio and releases the stored $NO_X$ when the exhaust gas is made rich in air-fuel ratio are known.

Japanese Patent Publication No. 11-81994 A1 discloses an internal combustion engine where a three-way catalyst is arranged at an upstream side and an $NO_X$ catalyst which reduces $NO_X$ by feeding of HC is arranged at the downstream side. It is disclosed that in this internal combustion engine, when the conditions for diagnosis of the catalyst stand, HC is fed in a pulse state to the three-way catalyst as a trace substance from an HC feed nozzle upstream of the three-way catalyst and the amount of adsorption of HC by the $NO_X$ catalyst (poisoned state) is estimated. Further, it is disclosed that the feed amount of HC which is fed as a reducing agent to the $NO_X$ catalyst is corrected in accordance with the amount of adsorption of HC by the $NO_X$ catalyst. It is disclosed that the greater the amount of adsorption of HC by the $NO_X$ catalyst, the smaller the HC feed amount should be set so as to prevent the amount of adsorption of HC by the $NO_X$ catalyst from exceeding a nonrecoverable poisoned limit value.

Japanese Patent Publication No. 9-4437 A1 discloses a nitrogen oxide removal system which is provided with a catalyst device which removes nitrogen oxides under an oxygen rich atmosphere and an HC increasing means for adding fuel as an HC increasing agent in the exhaust gas so as to increase the hydrocarbons in the exhaust gas. The control means of this removal system has a primary HC calculating unit which calculates the amount of increasing agent on a primary basis and a final HC calculating unit which corrects the primary calculated amount of the increasing agent and determines the final calculated amount. The primary HC calculating unit calculates the amount of the increasing agent on a primary basis from the state of the exhaust gas and the temperature of the catalyst bed. It is disclosed that the final HC calculating unit changes the amount of addition of the increasing agent based on the HC adsorption speed of the catalyst bed, the HC desorption speed, and the ratio of adsorption of hydrocarbons at the catalyst bed.

International Publication WO2011/114499 discloses an exhaust purification system of an internal combustion engine which arranges a hydrocarbon feed valve in an engine exhaust passage and which arranges an exhaust purification catalyst downstream of the hydrogen feed valve in the engine exhaust passage. This exhaust purification catalyst carries precious metal catalysts on an exhaust gas flow surface and is formed with basic exhaust gas flow surface parts around the precious metal catalysts. Further, it is disclosed to inject hydrocarbons, at the time of engine operation, from the hydrocarbon feed valve by a predetermined period of within 5 seconds and remove the $NO_X$ which is contained in the exhaust gas. With this exhaust purification system, it is possible to obtain a high $NO_X$ removal rate even if the exhaust purification catalyst becomes high in temperature.

Furthermore, International Publication No. WO2011/114501 discloses an exhaust purification system which injects hydrocarbons by the above predetermined period, wherein a first $NO_X$ removal method which maintains the exhaust gas which flows into the exhaust purification catalyst at the time of engine operation lean in air-fuel ratio while injects hydrocarbons from a hydrocarbon feed valve by a predetermined feed interval so as to remove the $NO_X$ which is contained in the exhaust gas and a second $NO_X$ removal method which switches the exhaust gas which flows into the exhaust purification catalyst from lean to rich in air-fuel ratio at intervals longer than a predetermined feed interval so as to remove the $NO_X$ are selectively used in accordance with the operating state of the internal combustion engine.

CITATIONS LIST

Patent Literature

PLT 1: Japanese Patent Publication (A) No. 11-81994 A1
PLT 2: Japanese Patent Publication No. 9-4437 A1
PLT 3: International Publication No. WO2011/114499
PLT 4: International Publication No. WO2011/114501

SUMMARY OF INVENTION

Technical Problem

As disclosed in the above-mentioned International Publication No. WO2011/114501, by selectively using the first $NO_X$ removal method and the second $NO_X$ removal method in an exhaust purification catalyst which has a predetermined configuration, a high $NO_X$ removal rate can be obtained. In particular, with the first $NO_X$ removal method, even if the exhaust purification catalyst becomes high in temperature, a high $NO_X$ removal rate can be obtained. In this regard, in the first $NO_X$ removal method, the hydrocarbons are fed to the exhaust purification catalyst at short intervals. In a predetermined state, sometimes the hydrocarbons flowed out from the exhaust purification catalyst. For example, sometimes the first $NO_X$ removal method was performed for a long time period, then high oxygen concentration exhaust gas flowed in or the catalyst temperature became high and the adsorbed hydrocarbons were desorbed or the adsorption capacity of hydrocarbons by the exhaust purification catalyst was exceeded and hydrocarbons flowed out from the exhaust purification catalyst.

The exhaust purification system preferably suppresses the outflow of hydrocarbons from the exhaust purification system which removes the $NO_X$. For example, when a catalyst which has an oxidation function is arranged downstream of an exhaust purification catalyst, sometimes, in this catalyst, the hydrocarbons are oxidized and the catalyst becomes excessively high in temperature. When a particulate filter is arranged downstream of the exhaust purification catalyst, the hydrocarbons which flow out from the exhaust purification catalyst flow into the particulate filter. The particulate filter carries a catalyst metal which has an oxidation function. Sometimes the hydrocarbons are oxidized and the allowable temperature was exceeded. Alternatively, sometimes the hydrocarbons slipped through the particulate filter resulting in the formation of white smoke.

The present invention has as its object the provision of an exhaust purification system of an internal combustion engine which removes $NO_X$ by a high $NO_X$ removal rate even at a high temperature and, further, suppresses the outflow of hydrocarbons.

Solution to Problem

The exhaust purification system of an internal combustion engine of the present invention is provided inside the engine exhaust passage with a hydrocarbon feed valve for feeding hydrocarbons, arranges an exhaust purification catalyst for causing $NO_X$ which is contained in exhaust gas and reformed hydrocarbons to react downstream of the hydrocarbon feed valve in the engine exhaust passage, carries precious metal catalysts on the exhaust gas flow surface of the exhaust purification catalyst, and forms basic exhaust gas flow surface parts around the precious metal catalysts. The exhaust purification catalyst has the property of reducing the $NO_X$ which is contained in the exhaust gas if making a concentration of hydrocarbons which flow into the exhaust purification catalyst vibrate by within a predetermined range of amplitude and by within a predetermined range of period and has the property of the amount of storage of $NO_X$ which is contained in the exhaust gas increasing if making a vibration period of the concentration of hydrocarbons longer than the predetermined range. At the time of engine operation, the amount of feed of hydrocarbons from the hydrocarbon feed valve is controlled so that the amplitude of the change of concentration of hydrocarbons which flow into the exhaust purification catalyst becomes within the above predetermined range of amplitude, while the feed interval of hydrocarbons from the hydrocarbon feed valve is controlled so that the concentration of hydrocarbons which flow into the exhaust purification catalyst vibrates by within a predetermined range of period. During this time period, the amount of adsorption of hydrocarbons in the exhaust purification catalyst is estimated. If the estimated amount of adsorption of hydrocarbons exceeds a predetermined judgment value of the adsorption amount, at least one control of control which reduces the amount of feed of hydrocarbons and control which lengthens the feed interval of hydrocarbons is performed.

In the above invention, preferably the system is formed to be able to perform a first $NO_X$ removal method which makes the concentration of hydrocarbons which flow into the exhaust purification catalyst vibrate by within the predetermined range of amplitude and by within the predetermined range of period and a second $NO_X$ removal method which makes the vibration period of the concentration of hydrocarbons longer than the predetermined range, and, during the time period when the first $NO_X$ removal method is being used to remove $NO_X$, if the amount of adsorption of hydrocarbons of the exhaust purification catalyst exceeds a predetermined switching judgment value, the first $NO_X$ removal method is switched to the second $NO_X$ removal method.

In the above invention, preferably, when the amount of adsorption of hydrocarbons of the exhaust purification catalyst exceeds a predetermined feed pattern change judgment value, at least one control of control which makes the amount of feed of hydrocarbons smaller and control which makes the feed interval of hydrocarbons longer by the amplitude of change of concentration of hydrocarbons within the predetermined range of amplitude and by the vibration of concentration of hydrocarbons within the predetermined range of period is performed.

In the above invention, preferably the system is formed to be able to perform a first $NO_X$ removal method which makes the concentration of hydrocarbons which flow into the exhaust purification catalyst vibrate by within the predetermined range of amplitude and by within the predetermined range of period and a second $NO_X$ removal method which makes the vibration period of the concentration of hydrocarbons longer than a predetermined range, during the time period when the first $NO_X$ removal method is being used to remove $NO_X$, the greater the amount of adsorption of hydrocarbons of the exhaust purification catalyst, the more at least one control of control which makes the amount of feed of hydrocarbons smaller and control which makes the feed interval of hydrocarbons longer by the amplitude of change of concentration of hydrocarbons within the predetermined range of amplitude and by the vibration of concentration of hydrocarbons within the predetermined range of period is performed, when the amount of adsorption of hydrocarbons of the exhaust purification catalyst exceeds a predetermined switching judgment value, control is performed to switch from the first $NO_X$ removal method to the second $NO_X$ removal method, and, when the amount of adsorption of hydrocarbons of the exhaust purification catalyst exceeds a predetermined stop judgment value, control is performed to stop the feed of hydrocarbons from the hydrocarbon feed valve.

Advantageous Effects of Invention

According to the present invention, it is possible to provide an exhaust purification system of an internal combustion engine which removes $NO_X$ with a high $NO_X$ removal rate even at a high temperature and, further, suppresses outflow of hydrocarbons.

DESCRIPTION OF EMBODIMENTS

Referring to FIG. 1 to FIG. 32, an exhaust purification system of an internal combustion engine in an embodiment will be explained. In the present embodiment, a compression ignition type of internal combustion engine which is mounted in a vehicle will be taken up as an example for the explanation.

Figure 1:
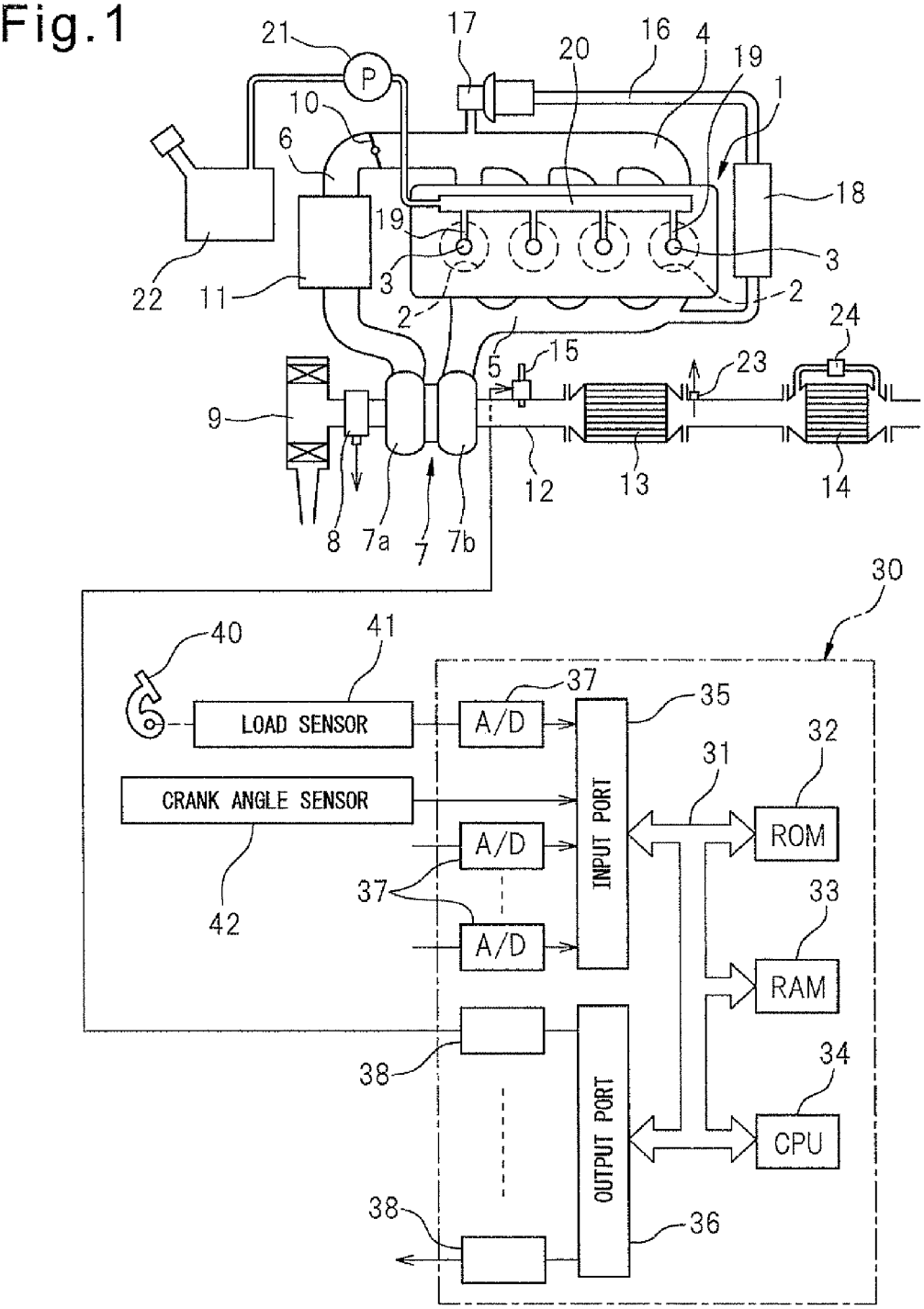
FIG. 1 is an overall view of an internal combustion engine in an embodiment.

FIG. 1 is an overall view of an internal combustion engine in the present embodiment. The internal combustion engine is provided with an engine body 1. Further, the internal combustion engine is provided with an exhaust purification system which purifies the exhaust. The engine body 1 includes combustion chambers 2 as cylinders, electronically controlled fuel injectors 3 for injecting fuel to the combustion chambers 2, an intake manifold 4, and an exhaust manifold 5.

The intake manifold 4 is connected through an intake duct 6 to an outlet of a compressor 7a of an exhaust turbocharger 7. An inlet of the compressor 7a is connected through an intake air detector 8 to an air cleaner 9. Inside the intake duct 6, a throttle valve 10 is arranged which is driven by a step motor. Furthermore, in the middle of the intake duct 6, a cooling device 11 is arranged for cooling the intake air which flows through the inside of the intake duct 6. In the embodiment which is shown in FIG. 1, engine cooling water is guided to the cooling device 11. The engine cooling water is used to cool the intake air.

On the other hand, the exhaust manifold 5 is connected to the inlet of the exhaust turbine 7b of the exhaust turbocharger 7. An outlet of the exhaust turbine 7b is connected through an exhaust pipe 12 to an inlet of an exhaust purification catalyst 13. An outlet of the exhaust purification catalyst 13 is connected to a particulate filter 14 which traps particulate which is contained in the exhaust.

Upstream of the exhaust purification catalyst 13, a hydrocarbon feed valve 15 is arranged for feeding hydrocarbons comprised of diesel oil which is used as the fuel of a compression ignition type internal combustion engine or other fuel. In the present embodiment, diesel oil is used as the hydrocarbons which are fed from the hydrocarbon feed valve 15. Note that, the present invention can also be applied to a spark ignition type of internal combustion engine in which the air-fuel ratio at the time of combustion is controlled to be lean. In this case, from the hydrocarbon feed valve, hydrocarbons comprised of gasoline which is used as the fuel of the spark ignition type of internal combustion engine or other fuel are fed.

Between the exhaust manifold 5 and the intake manifold 4, an EGR passage 16 is arranged for exhaust gas recirculation (EGR). In the EGR passage 16, an electronic control type of EGR control valve 17 is arranged. Further, in the middle of the EGR passage 16, a cooling device 18 is arranged for cooling the EGR gas which flows through the inside of the EGR passage 16. In the embodiment which is shown in FIG. 1, engine cooling water is guided to the inside of the cooling device 18. The engine cooling water is used to cool the EGR gas.

The respective fuel injectors 3 are connected through fuel feed tubes 19 to a common rail 20. The common rail 20 is connected through an electronic control type of variable discharge fuel pump 21 to a fuel tank 22. The fuel which is stored in the fuel tank 22 is fed by the fuel pump 21 to the inside of the common rail 20. The fuel which is fed to the common rail 20 is fed through the respective fuel feed tubes 19 to the fuel injectors 3.

An electronic control unit 30 is comprised of a digital computer. The electronic control unit 30 in the present embodiment functions as a control device of the exhaust purification system. The electronic control unit 30 includes components which are connected to each other by a bidirectional bus 31 such as a ROM (read only memory) 32, RAM (random access memory) 33, CPU (microprocessor) 34, input port 35, and output port 36.

Downstream of the exhaust purification catalyst 13, a temperature sensor 23 is attached for detecting the temperature of the exhaust purification catalyst 13. The particulate filter 14 has a differential pressure sensor 24 attached to it for detecting a differential pressure before and after the particulate filter 14. The output signals of the temperature sensor 23, differential pressure sensor 24, and intake air detector 8 are input through respectively corresponding AD converters 37 to the input port 35.

Further, an accelerator pedal 40 has a load sensor 41 connected to it which generates an output voltage which is proportional to the amount of depression of the accelerator pedal 40. The output voltage of the load sensor 41 is input through a corresponding AD converter 37 to the input port 35. Furthermore, the input port 35 has connected to it a crank angle sensor 42 which generates an output pulse every time the crankshaft rotates by for example 15°. The output of the crank angle sensor 42 can be used to detect the crank angle or the engine speed. On the other hand, the output port 36 is connected through corresponding drive circuits 38 to the fuel injectors 3, step motor for driving the throttle valve 10, hydrocarbon feed valve 15, EGR control valve 17, and fuel pump 21. These fuel injectors 3, throttle valve 10, hydrocarbon feed valve 15, EGR control valve 17, etc. are controlled by the electronic control unit 30.

The particulate filter 14 is a filter which removes carbon particles, sulfates, and other particulate which is contained in the exhaust. The particulate filter 14, for example, has a honeycomb structure and has a plurality of channels which extend in the direction of flow of the gas. In the plurality of channels, channels with downstream ends sealed and channels with upstream ends sealed are alternately formed. The partition walls of the channels are formed by a porous material such as cordierite. If the exhaust is passed through the partition walls, the particulate is trapped. The particulate is trapped at the particulate filter 14. The particulate which gradually builds up on the particulate filter 14 is removed by oxidation by raising the temperature inside an air-rich atmosphere to for example 650° C. or so.

Figure 2:
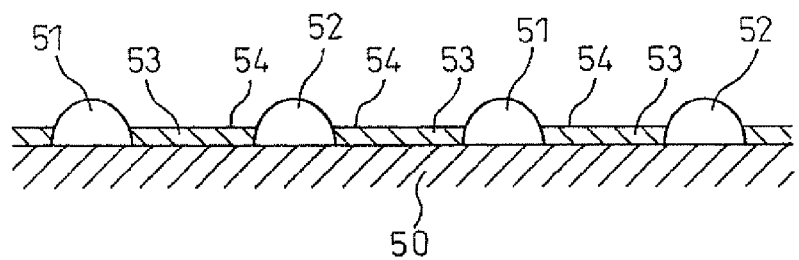
FIG. 2 is a view which schematically shows a surface part of a catalyst carrier of an exhaust purification catalyst.

FIG. 2 schematically shows a surface part of the catalyst carrier which is carried on the substrate of the exhaust purification catalyst 13. In this exhaust purification catalyst 13, as shown in FIG. 2, precious metal catalysts 51, 52 constituted by catalyst particles are carried on a catalyst carrier 50 comprised of for example alumina. Furthermore, on the catalyst carrier 50, a basic layer 53 is formed which includes at least one element selected from potassium K, sodium Na, cesium Cs, or other such alkali metal, barium Ba, calcium Ca, or other such alkali earth metal, a lanthanide and other rare earths and silver Ag, copper Cu, iron Fe, iridium Ir, and other such metals able to donate electrons to $NO_X$. The exhaust gas flows along the catalyst carrier 50, so the precious metal catalysts 51, 52 can be said to be carried on the exhaust gas flow surface of the exhaust purification catalyst 13. Further, the surface of the basic layer 53 exhibits basicity, so the surface of the basic layer 52 is called a "basic exhaust gas flow surface part 54".

On the other hand, in FIG. 2, the precious metal catalysts 51 are comprised of platinum Pt, while the precious metal catalysts 52 are comprised of rhodium Rh. Note that in this case, either of the precious metal catalysts 51, 52 can also be comprised of platinum Pt. Further, the catalyst carrier 50 of the exhaust purification catalyst 13 can further carry palladium Pd in addition to platinum Pt and rhodium Rh or can carry palladium Pd instead of rhodium Rh. That is, the precious metal catalysts 51, 52 which are carried on the catalyst carrier 50 are comprised of platinum Pt and at least one of rhodium Rh and palladium Pd.

Figure 3:
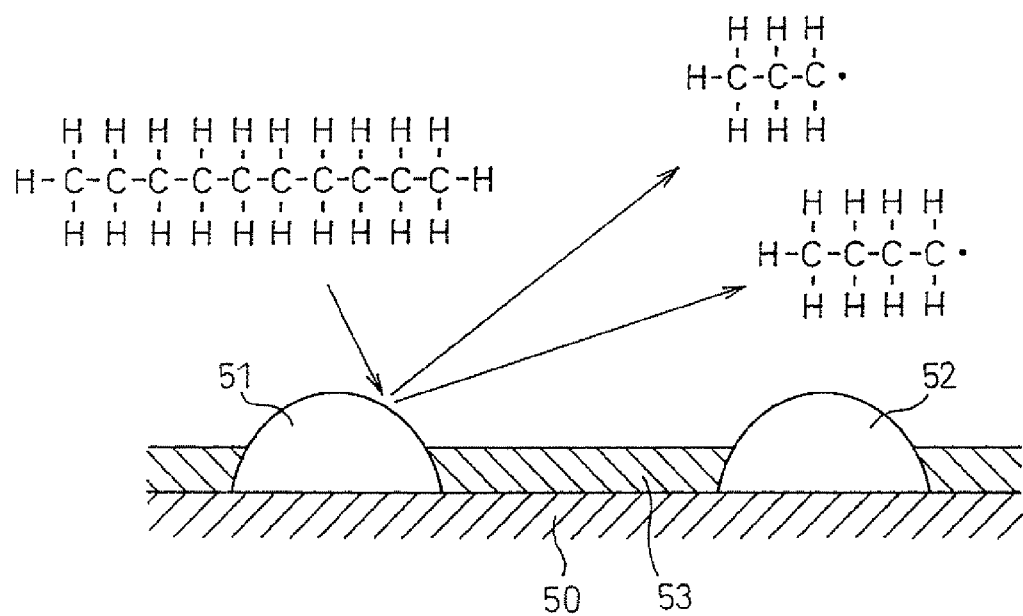
FIG. 3 is a view which explains an oxidation reaction of hydrocarbons in an exhaust purification catalyst.

If hydrocarbons are injected from the hydrocarbon feed valve 15 into the exhaust gas, the hydrocarbons are reformed at the exhaust purification catalyst 13. In the present invention, the hydrocarbons which were reformed at this time are used to remove the $NO_X$ at the exhaust purification catalyst 13. FIG. 3 schematically shows the reformation action which is performed in the exhaust purification catalyst 13 at this time. As shown in FIG. 3, the hydrocarbons HC which are injected from the hydrocarbon feed valve 15 become radical state hydrocarbons HC with few carbon atoms due to the catalyst 51.

Figure 4:
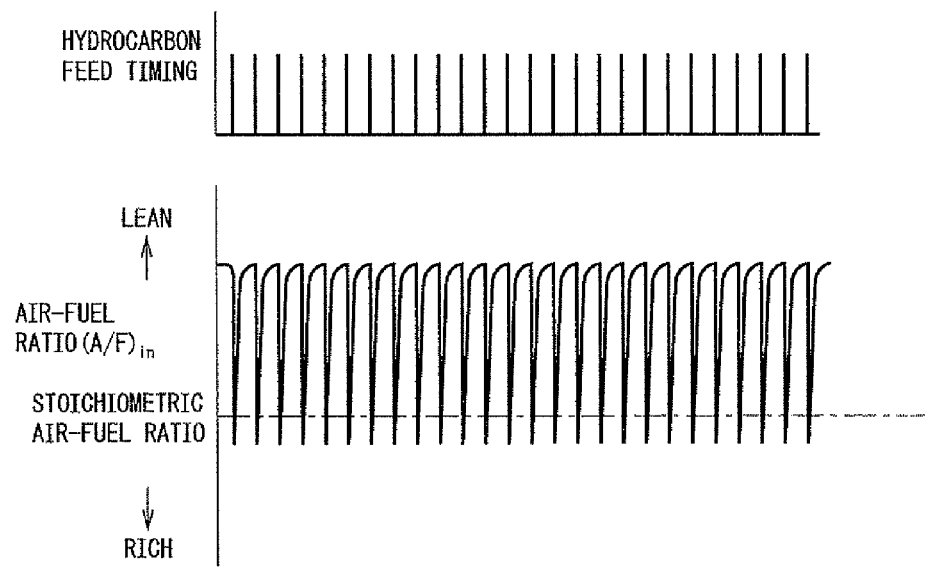
FIG. 4 is a view which shows changes in an air-fuel ratio of exhaust gas which flows into an exhaust purification catalyst in a first $NO_X$ removal method.

FIG. 4 shows the timing of feed of hydrocarbons from the hydrocarbon feed valve 15 and the change in the air-fuel ratio (A/F)in of the exhaust which flows into the exhaust purification catalyst 13. Note that, the change of the air-fuel ratio (A/F)in depends on the change in the concentration of hydrocarbons in the exhaust gas which flows into the exhaust purification catalyst 13, so the change in the air-fuel ratio (A/F)in which is shown in FIG. 4 can be said to express the change in the concentration of hydrocarbons. However, if the concentration of hydrocarbons becomes higher, the air-fuel ratio (A/F)in becomes smaller, so in FIG. 4, the richer the air-fuel ratio (A/F)in, the higher the concentration of hydrocarbons.

Figure 5:
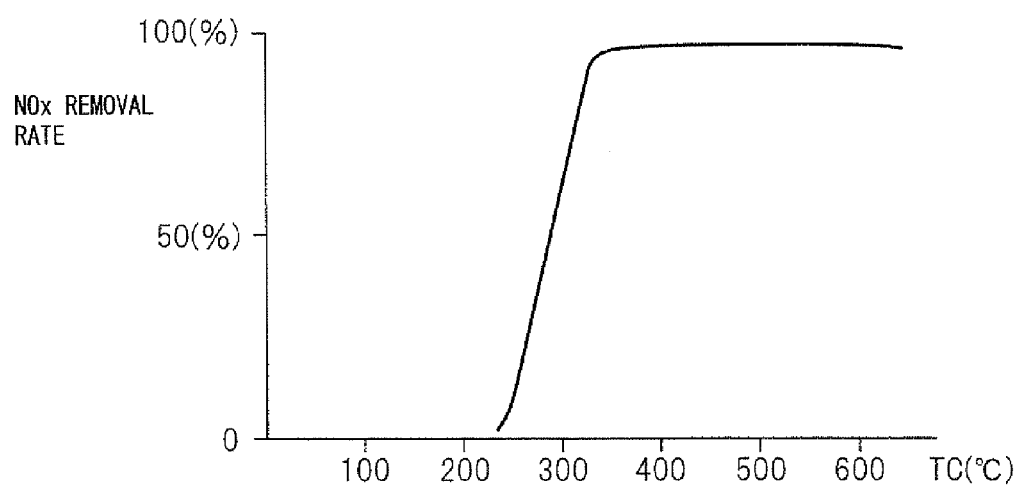
FIG. 5 is a view which shows an $NO_X$ removal rate of the first $NO_X$ removal method.

FIG. 5 shows the $NO_X$ removal rate by the exhaust purification catalyst 13 with respect to each catalyst temperature TC of the exhaust purification catalyst 13 when periodically changing the concentration of hydrocarbons which flow into the exhaust purification catalyst 13 so as to change the air-fuel ratio (A/F)in of the exhaust which flows into the exhaust purification catalyst 13 as shown in FIG. 4. The inventors engaged in extensive research on $NO_X$ removal over a long period of time and in the process of the research learned that if making the concentration of hydrocarbons which flow into the exhaust purification catalyst 13 vibrate by within a predetermined range of amplitude and by within a predetermined range of period, as shown in FIG. 5, an extremely high $NO_X$ removal rate is obtained even in the 400° C. or higher high temperature region.

Figure 6A:
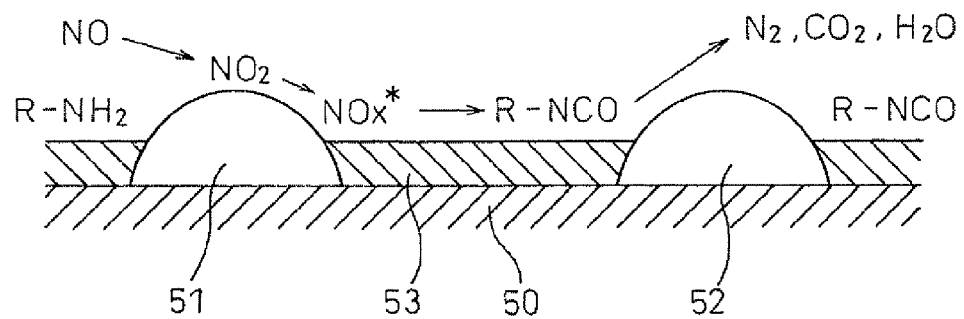
FIG. 6A is an enlarged view which explains an oxidation reduction reaction of an exhaust purification catalyst in the first $NO_X$ removal method.
Figure 6B:
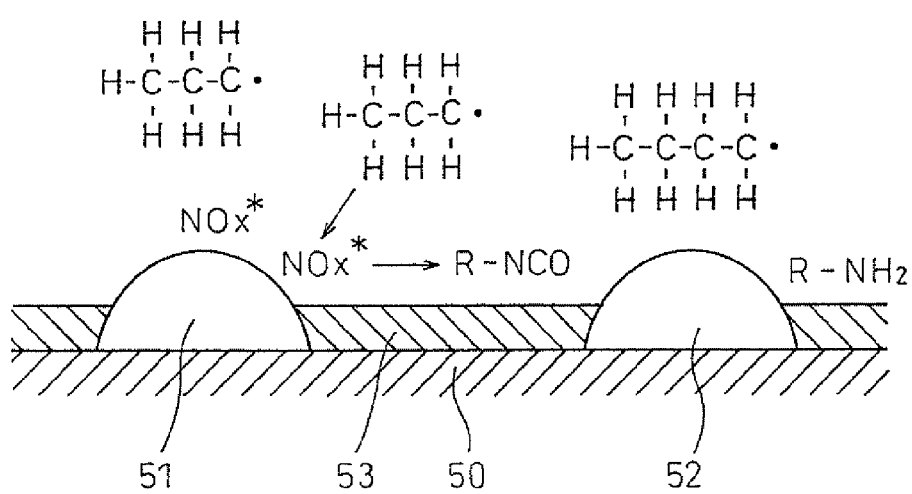
FIG. 6B is an enlarged view which explains production of reducing intermediates in the first $NO_X$ removal method.

Furthermore, at this time, they learned that a large amount of reducing intermediates containing nitrogen and hydrocarbons continues to be held or adsorbed on the surface of the basic layer 53, that is, on the basic exhaust gas flow surface parts 54 of the exhaust purification catalyst 13, and these reducing intermediates play a central role in obtaining a high $NO_X$ removal rate. Next, this will be explained with reference to FIG. 6A and FIG. 6B. Note that, FIG. 6A and FIG. 6B schematically show surface parts of the catalyst carrier 50 of the exhaust purification catalyst 13. FIG. 6A and FIG. 6B show the reaction which is presumed to occur when making the concentration of hydrocarbons which flow into the exhaust purification catalyst 13 vibrate by within a predetermined range of amplitude and by within a predetermined range of period.

FIG. 6A shows when the concentration of hydrocarbons which flows into the exhaust purification catalyst 13 is low, while FIG. 6B shows when hydrocarbons are fed from the hydrocarbon feed valve 15 and the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 usually becomes an excess of oxygen. At this time, part of the NO which is contained in the exhaust gas sticks on the exhaust purification catalyst 13, part of the NO which is contained in the exhaust gas, as shown in FIG. 6A, is oxidized on the precious metal catalysts 51 of platinum and become $NO_2$, then this $NO_2$ is further oxidized and becomes $NO_3$. Further, part of the $NO_2$ becomes $NO_2^-$. Therefore, $NO_2^-$ and $NO_3$ are produced on the precious metal catalysts 51 of platinum. The NO which is deposited on the exhaust purification catalyst 13 and the $NO_2^-$ and $NO_3$ which are produced on the platinum Pt 51 are strong in activity. Therefore, below, these NO, $NO_2^-$, and $NO_3$ will be called "active $NO_X$".

On the other hand, if hydrocarbons are fed from the hydrocarbon feed valve 15, the hydrocarbons are adsorbed over the entire exhaust purification catalyst 13. The majority of the adsorbed hydrocarbons successively react with the oxygen and are burned. Part of the adsorbed hydrocarbons are successively reformed inside the exhaust purification catalyst 13 and become radicals as shown in FIG. 3. Therefore, as shown in FIG. 6B, the concentration of hydrocarbons around the active $NO_X$ becomes higher. In this regard, after the active $NO_X$ is produced, if the state of a high concentration of oxygen around the active $NO_X$ continues for a certain time period or more, the active $NO_X$ will be oxidized and will be absorbed in the form of nitric acid ions $NO_3^-$ inside the basic layer 53. However, if the concentration of hydrocarbons around the active $NO_X$ becomes higher before this certain time period elapses, as shown in FIG. 6B, the active $NO_X$ will react with the radical state hydrocarbons HC on the precious metal catalysts 51 of platinum whereby the reducing intermediates will be produced. These reducing intermediates are held or adsorbed on the surface of the basic layer 53.

Note that, the reducing intermediate which is first produced at this time is believed to be the nitro compound R—$NO_2$. This nitro compound R—$NO_2$ becomes the nitrile compound R—CN when produced, but this nitrile compound R—CN can only survive in that state for an instant, so immediately becomes the isocyanate compound R—NCO. This isocyanate compound R—NCO becomes the amine compound R—$NH_2$ if hydrolyzed. However, in this case, what is hydrolyzed is believed to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, when, as shown in FIG. 6B, hydrocarbons HC are adsorbed around the produced reducing intermediates, the reducing intermediates are blocked by the hydrocarbons HC and will not react further. In this case, the concentration of hydrocarbons which flow into the exhaust purification catalyst 13 falls, then the hydrocarbons which are adsorbed around the reducing intermediates are oxidized and consumed. Due to this, if the concentration of oxygen around the reducing intermediates rises, as shown in FIG. 6A, the reducing intermediates will react with the active $NO_X$, react with the surrounding oxygen, or break down on their own. Due to this, the reducing intermediates R—NCO and R—$NH_2$ will be converted to $N_2$, $CO_2$, and $H_2O$ and therefore the $NO_X$ will be removed.

In this way, in the exhaust purification catalyst 13, the concentration of hydrocarbons which flow into the exhaust purification catalyst 13 is raised to produce reducing intermediates and the concentration of hydrocarbons which flow into the exhaust purification catalyst 13 is lowered, then, when the concentration of oxygen becomes high, the reducing intermediates are made to react with the active $NO_X$ or oxygen or self break down whereby the $NO_X$ is removed. That is, to use the exhaust purification catalyst 13 to remove the $NO_X$, it is necessary to periodically change the concentration of hydrocarbons which flow into the exhaust purification catalyst 13.

Of course, in this case, it is necessary to raise the concentration of hydrocarbons to a concentration sufficiently high for producing the reducing intermediates. It is necessary to lower the concentration of hydrocarbons to a concentration sufficiently low for the produced reducing intermediates to be reacted with the active $NO_X$ or oxygen or to break down on their own. That is, it is necessary to make the concentration of hydrocarbons which flow into the exhaust purification catalyst 13 vibrate by within a predetermined range of amplitude. Note that, in this case, it is necessary to hold the produced reducing intermediates R—NCO and R—$NH_2$ on the basic layer 53, that is, on the basic exhaust gas flow surface parts 54, until the reducing intermediates react with the active $NO_X$ or oxygen or until they break down on their own. The basic exhaust gas flow surface parts 54 are provided for this purpose.

On the other hand, if lengthening the feed interval of hydrocarbons, the time period during which the concentration of oxygen becomes higher in the interval after hydrocarbons are fed to when hydrocarbons are next fed becomes longer and therefore the active $NO_X$ is absorbed inside the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in an embodiment of the present invention, to make the $NO_X$ which is contained in the exhaust gas and the reformed hydrocarbons react to produce reducing intermediates R—NCO and R—$NH_2$ which contain nitrogen and hydrocarbons, precious metal catalysts 51 and 52 are carried on the exhaust gas flow surface of the exhaust purification catalyst 13. To hold the produced reducing intermediates R—NCO and R—$NH_2$ in the exhaust purification catalyst 13, basic exhaust gas flow surface parts 54 are formed around the precious metal catalysts 51, 52. The reducing intermediates R—NCO and R—$NH_2$ which are held on the basic exhaust gas flow surface part 54 are converted to $N_2$, $CO_2$, and $H_2O$. The vibration period of the concentration of hydrocarbons is made the vibration period which is necessary for continued production of the reducing intermediates R—NCO and R—$NH_2$. Incidentally, in the example which is shown in FIG. 4, the feed interval is made 3 seconds.

Figure 7A:
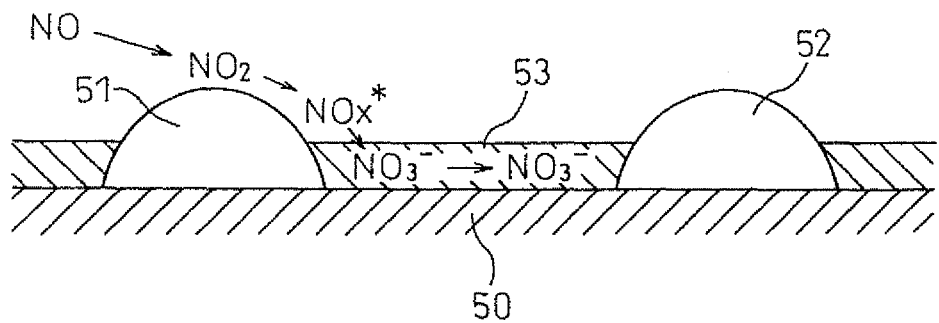
FIG. 7A is an enlarged view which explains storage of $NO_X$ in an exhaust purification catalyst in a second $NO_X$ removal method.

If the vibration period of the concentration of hydrocarbons, that is, the feed interval of hydrocarbons HC, becomes longer than the above predetermined range of period, the reducing intermediates R—NCO and R—$NH_2$ will disappear from the surface of the basic layer 53. At this time, the active $NO_X$ which is formed on the precious metal catalysts 51 of platinum Pt at this time, as shown in FIG. 7A, disperses in the form of nitric acid ions $NO_3^-$ inside of the basic layer 53 and become nitrates. That is, at this time, the $NO_X$ in the exhaust gas is absorbed inside the basic layer 53 in the form of nitrates.

Figure 7B:
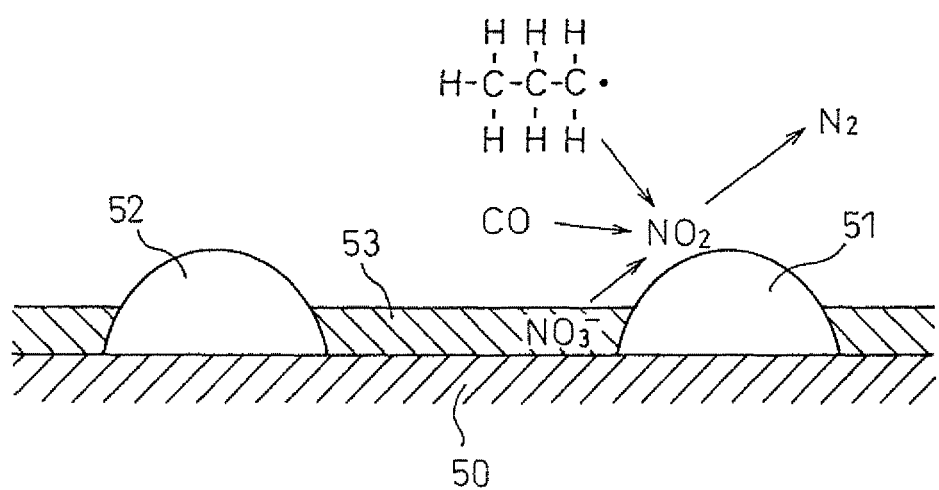
FIG. 7B is an enlarged view which explains release and reduction of $NO_X$ of an exhaust purification catalyst in the second $NO_X$ removal method.

On the other hand, FIG. 7B shows the case where when, in this way, $NO_X$ is absorbed in the basic layer 53 in the form of nitrates, the air-fuel ratio of the exhaust gas which flows into the exhaust purification catalyst 13 is made the stoichiometric air-fuel ratio or rich. In this case, the concentration of oxygen in the exhaust gas falls, so the reaction proceeds in the opposite direction ($NO_3^- \rightarrow NO_2$) and therefore the nitrates which are absorbed inside the basic layer 53 successively become nitric acid ions $NO_3^-$ and, as shown in FIG. 7B, are released in the form of $NO_2$ from the basic layer 53. Next, the released $NO_2$ is reduced by the hydrocarbons HC and CO which are contained in the exhaust gas.

Figure 8:
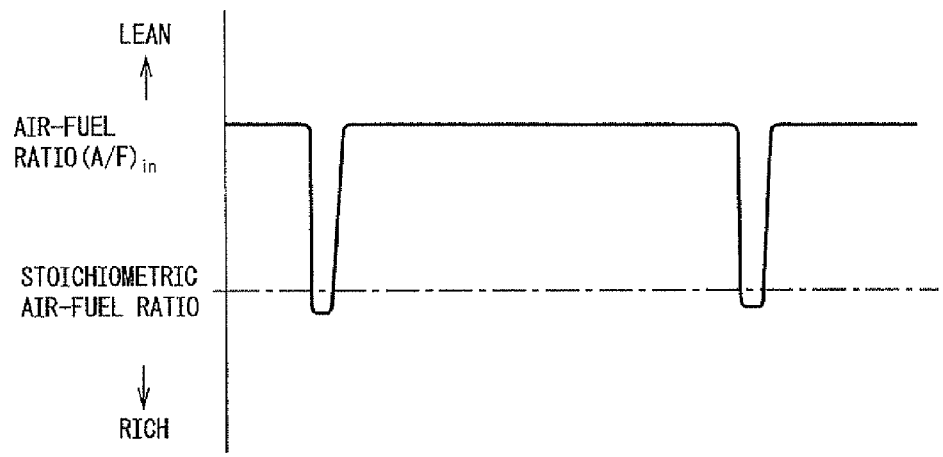
FIG. 8 is a view which shows changes in an air-fuel ratio of exhaust gas which flows into an exhaust purification catalyst in the second $NO_X$ removal method.

FIG. 8 shows the case of making the air-fuel ratio (A/F)in of the exhaust gas which flows into the exhaust purification catalyst 13 temporarily rich slightly before the $NO_X$ absorption ability of the basic layer 53 becomes saturated. Note that, in the example which is shown in FIG. 8, the time interval of this rich control is 1 minute or more. In this case, the $NO_X$ which was absorbed inside the basic layer 53 when the air-fuel ratio (A/F)in of the exhaust gas is lean is released all at once from the basic layer 53 and reduced when the air-fuel ratio (A/F)in of the exhaust gas is made temporarily rich. Therefore, in this case, the basic layer 53 performs the role of an absorbent for temporarily absorbing the $NO_X$.

Note that, at this time, sometimes the basic layer 53 temporarily adsorbs the $NO_X$. Therefore, if using the term "storage" as a term including both absorption and adsorption, at this time the basic layer 53 performs the role of an $NO_X$ storage agent for temporarily storing the $NO_X$. That is, in this case, if referring to the ratio of the air and fuel (hydrocarbons) which are fed into the engine intake passage, combustion chambers 2, and exhaust passage upstream of the exhaust purification catalyst 13 as the "air-fuel ratio of the exhaust gas", the exhaust purification catalyst 13 functions as an $NO_X$ storage catalyst which stores the $NO_X$ when the air-fuel ratio of the exhaust gas is lean and releases the stored $NO_X$ when the concentration of oxygen in the exhaust gas falls.

Figure 9:
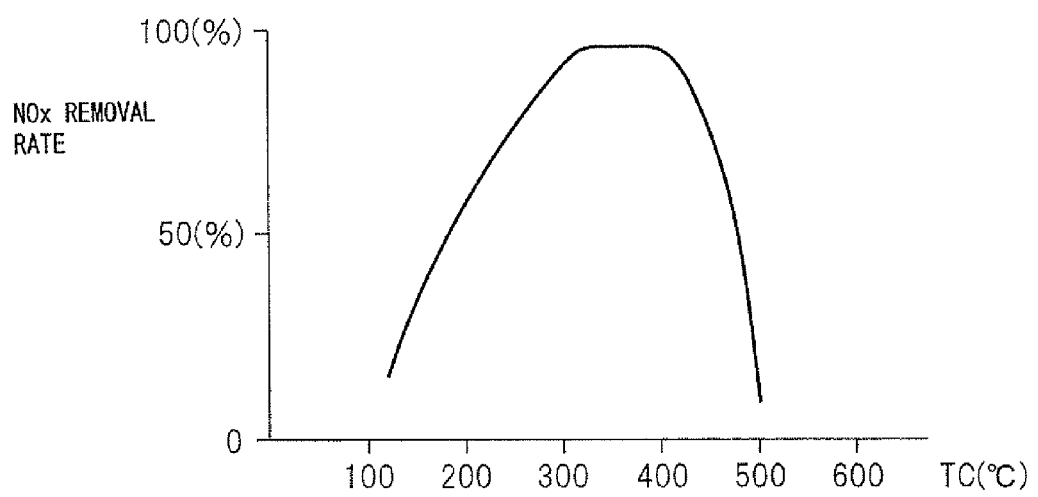
FIG. 9 is a view which shows an $NO_X$ removal rate in the second $NO_X$ removal method.

FIG. 9 shows the $NO_X$ removal rate when making the exhaust purification catalyst 13 function as an $NO_X$ storage catalyst in this way. Note that, the abscissa of FIG. 9 indicates the catalyst temperature TC of the exhaust purification catalyst 13. When making the exhaust purification catalyst 13 function as an $NO_X$ storage catalyst, as shown in FIG. 9, when the catalyst temperature TC is from 300° C. to 400° C., an extremely high $NO_X$ removal rate is obtained, but if the catalyst temperature TC becomes a 400° C. or more high temperature, the $NO_X$ removal rate falls.

In this way, the $NO_X$ removal rate falls if the catalyst temperature TC becomes 400° C. or more because if the catalyst temperature TC becomes 400° C. or more, nitrates break down by heat and are released in the form of $NO_2$ from the exhaust purification catalyst 13. That is, so long as storing $NO_X$ in the form of nitrates, when the catalyst temperature TC is high, a high $NO_X$ removal rate is hard to obtain. However, in the new $NO_X$ removal method which is shown from FIG. 4 to FIG. 6A and FIG. 6B, as will be understood from FIG. 6A and FIG. 6B, nitrates are not produced or even if produced are extremely small in amount. Therefore, as shown in FIG. 5, even when the catalyst temperature TC is high, a high $NO_X$ removal rate is obtained.

Therefore, in the present invention, a hydrocarbon feed valve 15 for feeding hydrocarbons is arranged inside the engine exhaust passage, an exhaust purification catalyst 13 for making the $NO_X$ which is contained in exhaust gas and reformed hydrocarbons react is arranged downstream of the hydrocarbon feed valve 15 in the engine exhaust passage, the exhaust gas flow surface of the exhaust purification catalyst 13 carries precious metal catalysts 51, 52, and basic exhaust gas flow surface parts 54 are formed around the precious metal catalysts 51, 52. The exhaust purification catalyst 13 has the property of reducing the $NO_X$ which is contained in the exhaust gas if making the concentration of hydrocarbons which flow into the exhaust purification catalyst 13 vibrate by within a predetermined range of amplitude and by within a predetermined range of period and has the property of the amount of storage of $NO_X$ which is contained in the exhaust gas increasing if making the vibration period of the concentration of hydrocarbons longer than this predetermined range. At the time of engine operation, the concentration of hydrocarbons which flow into the exhaust purification catalyst 13 is made to vibrate by within a predetermined range of amplitude and by within a predetermined range of period so as to thereby reduce the $NO_X$ which is contained in the exhaust gas at the exhaust purification catalyst 13.

The $NO_X$ removal method which is shown from FIG. 4 to FIG. 6A and FIG. 6B can be said to be a new $NO_X$ removal method designed to remove the $NO_X$ without forming almost any nitrates when using an exhaust purification catalyst which carries precious metal catalysts and forms a basic layer which can absorb the $NO_X$. In actuality, when using this new $NO_X$ removal method, the amount of nitrates which are detected from the basic layer 53 becomes extremely small compared to when making the exhaust purification catalyst 13 function as an $NO_X$ storage catalyst. Note that, this new $NO_X$ removal method will be referred to below as the "first $NO_X$ removal method".

Next, this first $NO_X$ removal method will be explained in a bit more detail while referring to FIG. 10 to FIG. 15.

Figure 10:
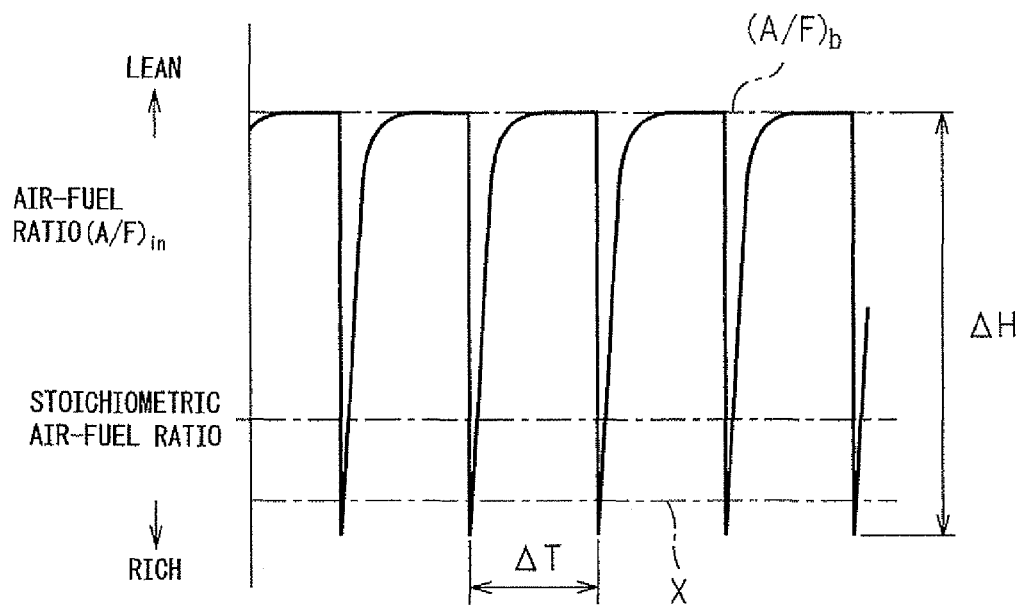
FIG. 10 is a time chart which shows changes in an air-fuel ratio of exhaust gas which flows into an exhaust purification catalyst in the first $NO_X$ removal method.

FIG. 10 shows the change in the air-fuel ratio (A/F)in which is shown in FIG. 4 enlarged. Note that, as explained above, the change in the air-fuel ratio (A/F)in of the exhaust gas which flows into the exhaust purification catalyst 13 simultaneously shows the change in the concentration of hydrocarbons which flow into the exhaust purification catalyst 13. Note that, in FIG. 10, ΔH shows the amplitude of the change in concentration of the hydrocarbons NC which flow into the exhaust purification catalyst 13, while ΔT shows the vibration period of the concentration of hydrocarbons which flow into the exhaust purification catalyst 13.

Furthermore, in FIG. 10, (A/F)b expresses the base air-fuel ratio which shows the air-fuel ratio of the combustion gas for generating the engine output. In other words, this base air-fuel ratio (A/F)b expresses the air-fuel ratio of the exhaust gas which flows into the exhaust purification catalyst 13 when stopping the feed of hydrocarbons. On the other hand, in FIG. 10, X shows the upper limit of the air-fuel ratio (A/F)in which is used for production of reducing intermediates without the produced active $NO_X$ being stored in the basic layer 53 in the form of nitrates. To make the active $NO_X$ and the reformed hydrocarbons react and produce reducing intermediates, it is necessary to make the air-fuel ratio (A/F)in lower than the upper limit X of the air-fuel ratio.

In other words, X of FIG. 10 expresses the lower limit of the concentration of hydrocarbons which is necessary for reacting the active $NO_X$ with the reformed hydrocarbons and producing reducing intermediates. To cause production of reducing intermediates, it is necessary to raise the concentration of hydrocarbons to above this lower limit X as well. In this case, whether reducing intermediates are produced is determined by the ratio between concentration of oxygen and the concentration of hydrocarbons around the active $NO_X$, that is, the air-fuel ratio (A/F)in. The above-mentioned upper limit X of the air-fuel ratio which is necessary for causing production of reducing intermediates will be referred to below as the "demanded minimum air-fuel ratio".

Figure 11:
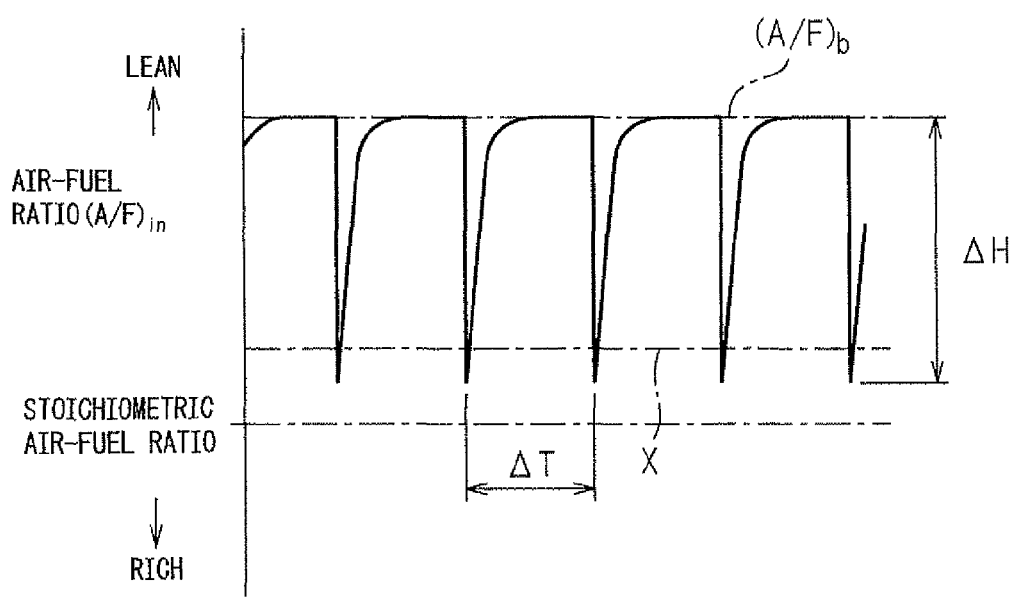
FIG. 11 is another time chart which shows changes in the air-fuel ratio of exhaust gas which flows into an exhaust purification catalyst in the first $NO_X$ removal method.

In the example which is shown in FIG. 10, the demanded minimum air-fuel ratio X becomes rich. Therefore, in this case, to cause production of reducing intermediates, the air-fuel ratio (A/F)in is instantaneously made the demanded minimum air-fuel ratio X or less, that is, rich. As opposed to this, in the example which is shown in FIG. 11, the demanded minimum air-fuel ratio X is lean. In this case, the air-fuel ratio (A/F)in is maintained lean while periodically lowering the air-fuel ratio (A/F)in so as to produce reducing intermediates.

In this case, whether the demanded minimum air-fuel ratio X becomes rich or lean depends on the oxidizing power of the exhaust purification catalyst 13. In this case, the exhaust purification catalyst 13 for example becomes stronger in oxidizing power if increasing the amount of precious metal 51 carried and becomes stronger in oxidizing power if strengthening the acidity. Therefore, the oxidizing power of the exhaust purification catalyst 13 changes depending on the amount of the precious metal 51 carried or the strength of the acidity.

Now, when using an exhaust purification catalyst 13 with a strong oxidizing power, as shown in FIG. 11, if maintaining the air-fuel ratio (A/F)in lean while periodically lowering the air-fuel ratio (A/F)in, when the air-fuel ratio (A/F)in is lowered, the hydrocarbons end up being completely oxidized and as a result the reducing intermediates can no longer be produced. As opposed to this, when using an exhaust purification catalyst 13 with a strong oxidizing power, as shown in FIG. 10, if periodically making the air-fuel ratio (A/F)in rich, part of the hydrocarbons are partially oxidized without being completely oxidized when the air-fuel ratio (A/F)in is made rich, that is, the hydrocarbons are reformed, and therefore reducing intermediates are produced. Therefore, when using an exhaust purification catalyst 13 with a strong oxidizing power, the demanded minimum air-fuel ratio X has to be made rich.

On the other hand, when using an exhaust purification catalyst 13 with a weak oxidizing power, as shown in FIG. 11, if maintaining the air-fuel ratio (A/F)in lean while periodically lowering the air-fuel ratio (A/F)in, part of the hydrocarbons are partially oxidized without being completely oxidized, that is, the hydrocarbons are reformed, and therefore reducing intermediates are produced. As opposed to this, if using an exhaust purification catalyst 13 with a weak oxidizing power, as shown in FIG. 10, if making the air-fuel ratio (A/F)in periodically rich, a large amount of hydrocarbons is simply exhausted from the exhaust purification catalyst 13 without being oxidized and therefore the amount of hydrocarbons which is wastefully consumed increases. Therefore, when using an exhaust purification catalyst 13 with a weak oxidizing power, the demanded minimum air-fuel ratio X must be made lean.

Figure 12:
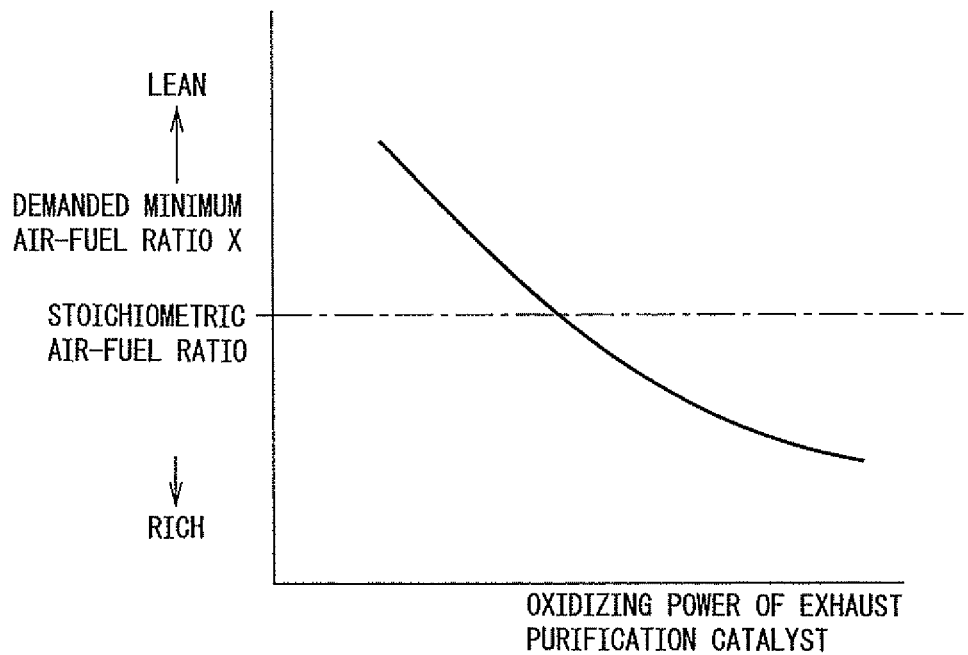
FIG. 12 is a view which shows the relationship between the oxidizing power of an exhaust purification catalyst and a demanded minimum air-fuel ratio X in the first $NO_X$ removal method.

That is, it is learned that the demanded minimum air-fuel ratio X, as shown in FIG. 12, has to be lowered the stronger the oxidizing power of the exhaust purification catalyst 13. In this way, the demanded minimum air-fuel ratio X is made lean or rich by the oxidizing power of the exhaust purification catalyst 13, but below the case where the demanded minimum air-fuel ratio X is rich will be used as an example to explain the amplitude of the change in the concentration of hydrocarbons which flow into the exhaust purification catalyst 13 or the vibration period of the concentration of hydrocarbons which flow into the exhaust purification catalyst 13.

Now then, if the base air-fuel ratio (A/F)b becomes larger, that is, if the concentration of oxygen in the exhaust before the hydrocarbons are fed becomes higher, the amount of feed of hydrocarbons required for making the air-fuel ratio (A/F)in the demanded minimum air-fuel ratio X or less increases. Along with this, the excess amount of hydrocarbons which fail to contribute to generation of reducing intermediates is increased. In this case, to remove $NO_X$ well, as explained above, it is necessary to cause the excess hydrocarbons to oxidize. Therefore, to remove the $NO_X$ well, the greater the amount of excess hydrocarbons, the greater the amount of oxygen which is required.

In this case, if raising the concentration of oxygen in the exhaust gas, it is possible to increase the amount of oxygen. Therefore, to remove the $NO_X$ well, when the concentration of oxygen in the exhaust gas before the hydrocarbons are fed is high, it is necessary to raise the concentration of oxygen in the exhaust gas after the feed of hydrocarbons. That is, the higher the concentration of oxygen in the exhaust before hydrocarbons are fed, the larger the amplitude of the concentration of hydrocarbons has to be made.

Figure 13:
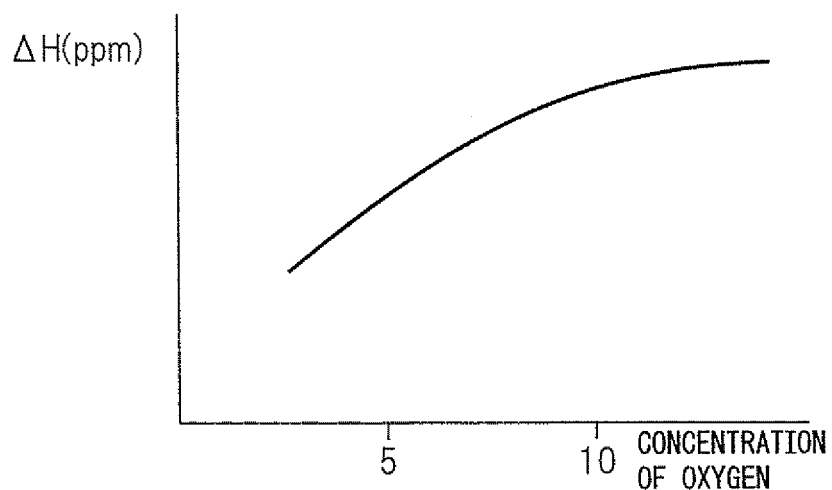
FIG. 13 is a view which shows the relationship between a concentration of oxygen in exhaust gas and an amplitude ΔH of the concentration of hydrocarbons which gives the same $NO_X$ removal rate in the first $NO_X$ removal method.

FIG. 13 shows the relationship between the concentration of oxygen in the exhaust gas before hydrocarbons are fed and the amplitude $\Delta H$ of the concentration of hydrocarbons when the same $NO_X$ removal rate is obtained. From FIG. 13, it is learned that to obtain the same $NO_X$ removal rate, the higher the concentration of oxygen in the exhaust gas before hydrocarbons are fed, the more the amplitude $\Delta H$ of the concentration of hydrocarbons has to be increased. That is, to obtain the same $NO_X$ removal rate, the higher the base air-fuel ratio (A/F)b, the more the amplitude $\Delta H$ of the concentration of hydrocarbons has to be increased. In other words, to remove the $NO_X$ well, it is possible to reduce the amplitude $\Delta H$ of the concentration of hydrocarbons the lower the base air-fuel ratio (A/F)b becomes.

Figure 14:
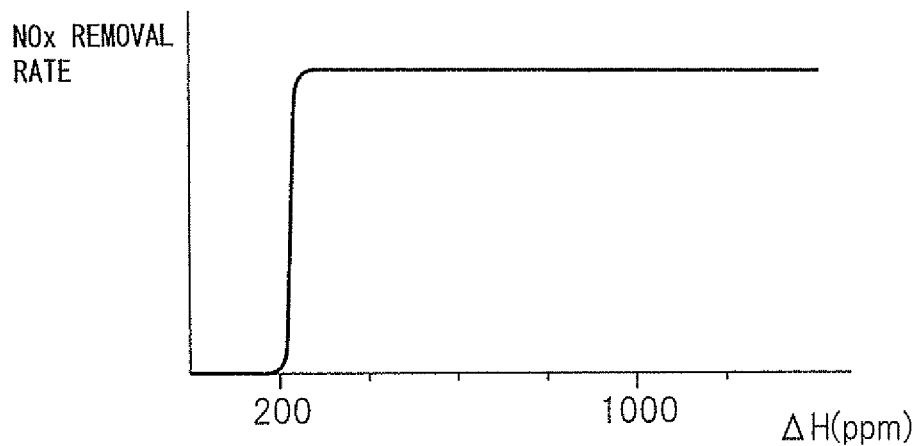
FIG. 14 is a view which shows the relationship between an amplitude ΔH of the concentration of hydrocarbons and an $NO_X$ removal rate in the first $NO_X$ removal method.

In this regard, the base air-fuel ratio (A/F)b becomes the lowest at the time of acceleration operation. At this time, if the amplitude $\Delta H$ of the concentration of hydrocarbons is 200 ppm or so, $NO_X$ can be removed well. The base air-fuel ratio (A/F)b usually becomes larger than the time of acceleration operation. Therefore, as shown in FIG. 14, a good $NO_X$ removal rate can be obtained if the amplitude $\Delta H$ of the concentration of hydrocarbon is 200 ppm or more.

On the other hand, it is learned that when the base air-fuel ratio (A/F)b is the highest, if making the amplitude $\Delta H$ of the concentration of hydrocarbons 10000 ppm or so, a good $NO_X$ removal rate can be obtained. Therefore, in the present invention, the predetermined range of amplitude of the concentration of hydrocarbons is made 200 ppm to 10000 ppm.

Figure 15:
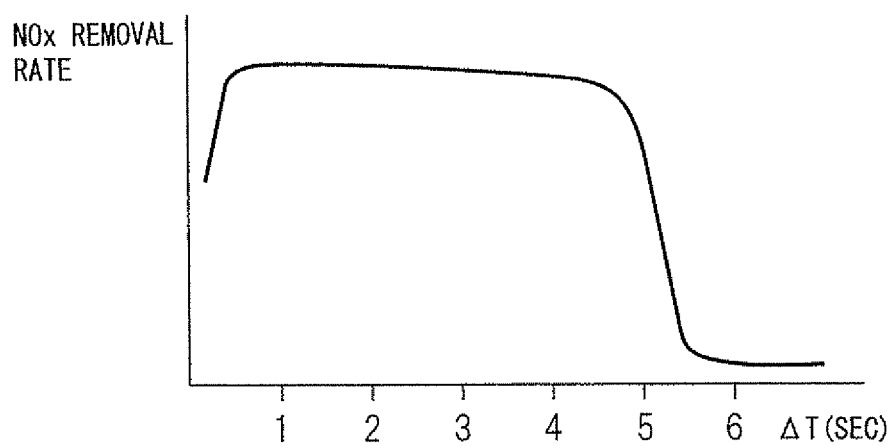
FIG. 15 is a view which shows the relationship between a vibration period ΔT of the concentration of hydrocarbons and an $NO_X$ removal rate in the first $NO_X$ removal method.

Further, if the vibration period $\Delta T$ of the concentration of hydrocarbons becomes longer, the interval in which the concentration of oxygen around the active $NO_X$ becomes high after hydrocarbons are fed to when hydrocarbons are next fed becomes longer. In this case, if the vibration period $\Delta T$ of the concentration of hydrocarbons becomes longer than 5 seconds or so, the active $NO_X$ starts to be absorbed inside the basic layer 53 in the form of nitrates. Therefore, as shown in FIG. 15, if the vibration period $\Delta T$ of the concentration of hydrocarbons becomes longer than 5 seconds or so, the $NO_X$ removal rate falls. Therefore, the vibration period $\Delta T$ of the concentration of hydrocarbons has to be made 5 seconds or less.

On the other hand, if the vibration period $\Delta T$ of the concentration of hydrocarbons becomes about 0.3 second or less, the fed hydrocarbons start to build up on the exhaust gas flow surface of the exhaust purification catalyst 13. Therefore, as shown in FIG. 15, if the vibration period $\Delta T$ of the concentration of hydrocarbons becomes about 0.3 second or less, the $NO_X$ removal rate falls. Therefore, in the present invention, the vibration period of the concentration of hydrocarbons is made an interval of 0.3 second to 5 seconds.

Figure 16A:
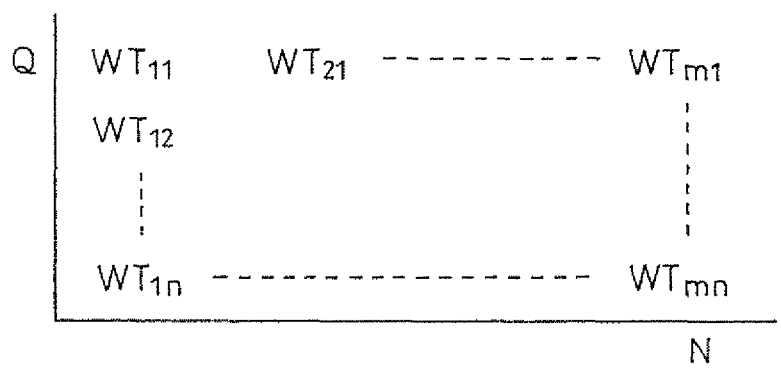
FIG. 16A is a map which shows the injection time period of hydrocarbons in the first $NO_X$ removal method.
Figure 16B:
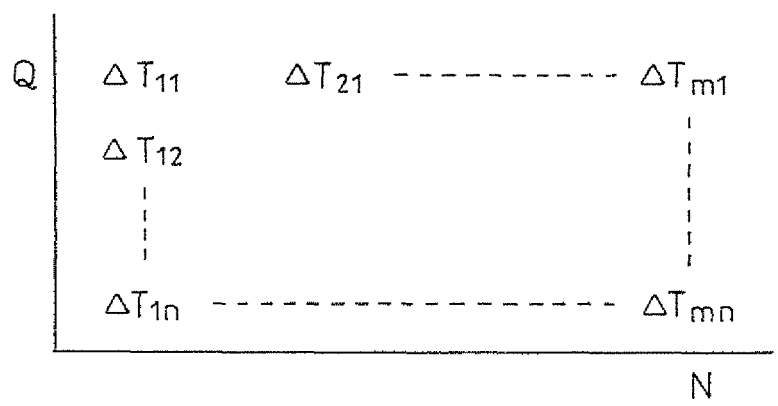
FIG. 16B is a map which shows the feed interval of hydrocarbons in the first $NO_X$ removal method.

Now, in an embodiment of the present invention, control is performed to change the amount of feed and feed interval of hydrocarbons from the hydrocarbon feed valve 15 so that the amplitude $\Delta H$ and vibration period $\Delta T$ of the concentration of hydrocarbons become the optimum values corresponding to the operating state of the engine. In this case, in an embodiment of the present invention, the amount of feed WT of hydrocarbons which can give the optimum amplitude $\Delta H$ of the concentration of hydrocarbons is stored in advance inside the ROM 32 as a function of the amount of injection Q from the fuel injectors 3 and the engine speed N in the form of a map as shown in FIG. 16A. Further, the optimum vibration amplitude $\Delta T$ of the concentration of hydrocarbons, that is, injection interval $\Delta T$ of hydrocarbons, is similarly stored as a function of the amount of injection Q from the fuel injectors 3 and engine speed N in the form of a map such as shown in FIG. 16B in the ROM 32.

Next, referring to FIG. 17 to FIG. 20, the method of removal of $NO_X$ when making the exhaust purification catalyst 13 function as an $NO_X$ storage catalyst will be explained in detail. The method of $NO_X$ removal when making the exhaust purification catalyst 13 function as an $NO_X$ storage catalyst in this way will be referred to below as the "second $NO_X$ removal method".

Figure 17:
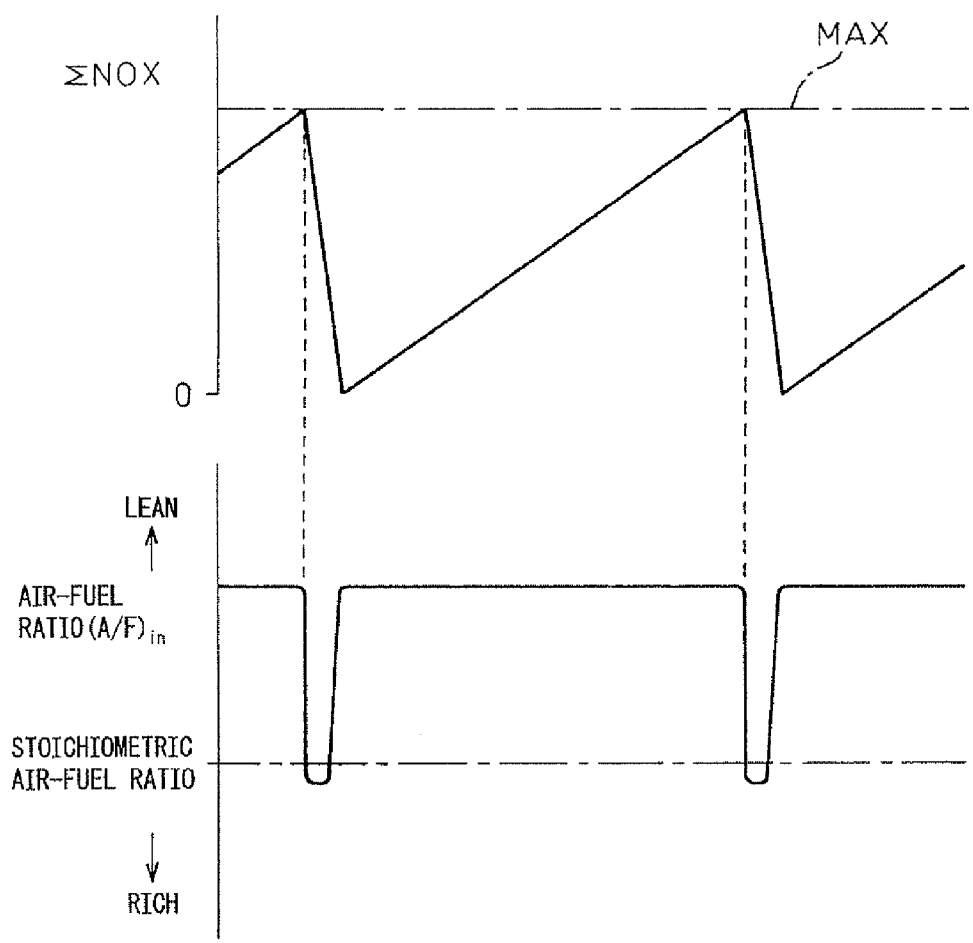
FIG. 17 is a view which shows changes in the air-fuel ratio of the exhaust gas which flows into the exhaust purification catalyst in the second $NO_X$ removal method.

In this second $NO_X$ removal method, as shown in FIG. 17, when the stored $NO_X$ amount $\Sigma NO_X$ which is stored in the basic layer 53 exceeds a predetermined allowable amount MAX, the air-fuel ratio (A/F)in of the exhaust gas which flows into the exhaust purification catalyst 13 is temporarily made rich. If the air-fuel ratio (A/F)in of the exhaust is made rich, the $NO_X$ which was stored in the basic layer 53 when the air-fuel ratio (A/F)in of the exhaust was lean is released all at once from the basic layer 53 and reduced. Due to this, the $NO_X$ is removed.

Figure 18:
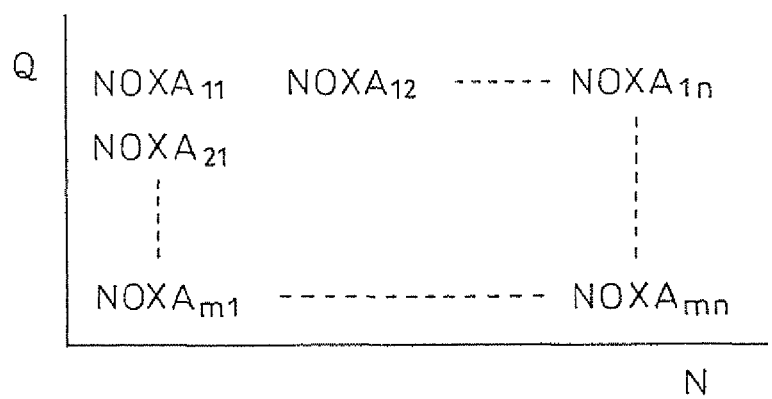
FIG. 18 is a view which shows a map of an $NO_X$ amount NOXA which is exhausted from an engine body to the engine exhaust passage.

The stored $NO_X$ amount $\Sigma NO_X$, for example, is calculated from the amount of $NO_X$ which is exhausted from the engine. In an embodiment according to the present invention, the exhausted $NO_X$ amount NOXA which is exhausted from the engine per unit time is stored as a function of the amount of injection Q from the fuel injectors 3 and engine speed N in the form of the map such as shown in FIG. 18 in advance in the ROM 32. The stored $NO_X$ amount $\Sigma NO_X$ is calculated from this exhausted $NO_X$ amount NOXA. In this case, as explained above, the period during which the air-fuel ratio (A/F)in of the exhaust is made rich is usually 1 minute or more.

Figure 19:
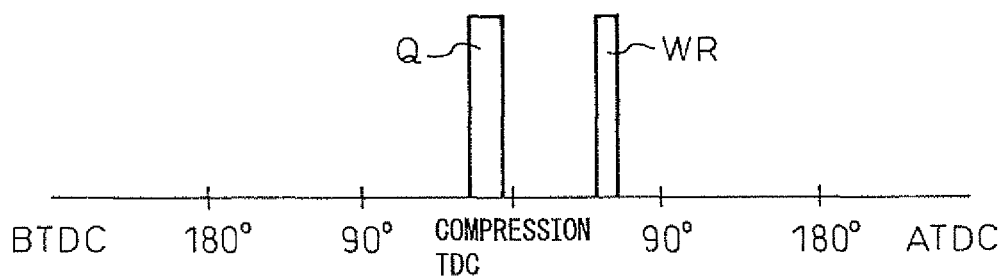
FIG. 19 is a view which shows a fuel injection timing when performing auxiliary injection in a combustion chamber.
Figure 20:
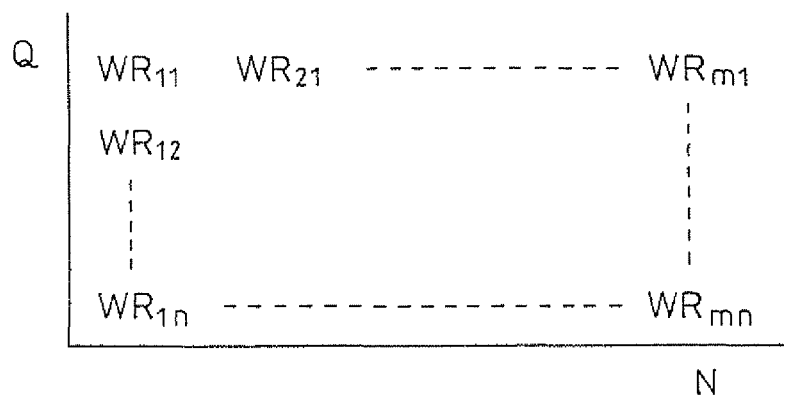
FIG. 20 is a view which shows a map of the hydrocarbon feed amount WR when performing auxiliary injection.

In this second $NO_X$ removal method, as shown in FIG. 19, by injecting additional fuel as auxiliary injection in an amount of injection WR in addition to the amount of injection Q of the main injection of combustion use fuel into the combustion chambers 2 from the fuel injectors 3, the air-fuel ratio (A/F)in of the exhaust gas which flows into the exhaust purification catalyst 13 is made rich. Note that, in FIG. 19, the abscissa shows the crank angle. This additional fuel WR is injected at a timing where it burns, but does not become engine output, that is, slightly before ATDC90° after top dead center of compression. This amount of injection WR of the auxiliary injection is stored as a function of the amount of injection Q from the fuel injectors 3 and engine speed N in the form of the map such as shown in FIG. 20 in advance in the ROM 32. Of course, in this case, it is possible to increase the amount of feed of hydrocarbons from the hydrocarbon feed valve 15 so as to make the air-fuel ratio (A/F)in of the exhaust gas rich.

Figure 21:
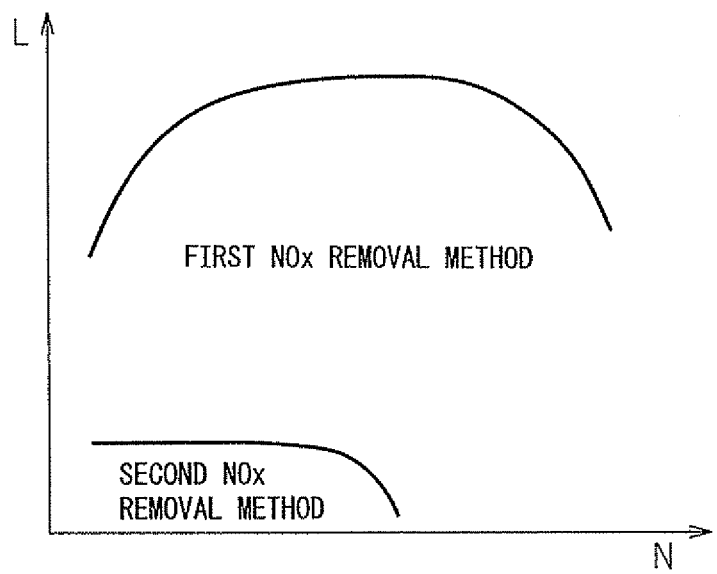
FIG. 21 is a graph which explains the regions of the $NO_X$ removal methods based on the operating state of the internal combustion engine.

FIG. 21 shows a graph which explains the $NO_X$ removal methods of the exhaust purification system of the present embodiment. The abscissa indicates the engine speed N, while the ordinate indicates the load L which corresponds to the amount of injection Q from the fuel injectors 3. FIG. 21 is a view which explains the basic $NO_X$ removal methods of an exhaust purification system in the present embodiment.

In the exhaust purification system of the present embodiment, the engine speed and the load are used to set a region for performing the first $NO_X$ removal method and a region for performing the second $NO_X$ removal method. To remove $NO_X$ with a high removal rate in the first $NO_X$ removal method, preferably the exhaust purification catalyst 13 is activated. That is, to sufficiently cause generation of active $NO_X$ which flows into the exhaust purification catalyst 13, partial oxidation of hydrocarbons, generation of reducing intermediates, etc., activation of the exhaust purification catalyst is preferable. In the region of a low temperature of the exhaust purification catalyst 13, storage of $NO_X$ may be used to remove $NO_X$ from the exhaust gas. In terms of the $NO_X$ removal rate in the region where the exhaust purification catalyst 13 is low in temperature, the second $NO_X$ removal method becomes higher than the first $NO_X$ removal method.

In the exhaust purification system of the present embodiment, in a region where the load is small and, further, the engine speed is small, the second $NO_X$ removal method is employed, while in other regions, the first $NO_X$ removal method is employed. In this way, the $NO_X$ removal method where the $NO_X$ removal rate becomes higher among the first $NO_X$ removal method and the second $NO_X$ removal method can be selected in accordance with the operating state of the internal combustion engine.

In this regard, as explained above, when using the first $NO_X$ removal method to remove $NO_X$, if hydrocarbons are fed from the hydrocarbon feed valve 15, the hydrocarbons will be adsorbed at the exhaust purification catalyst. The "adsorption of hydrocarbons" here includes both physical adsorption in which the hydrocarbons stick on the substrate, catalyst carrier, etc. of the exhaust purification catalyst 13 and chemical adsorption in which the hydrocarbons are held at the acid points of the catalyst metal of the exhaust purification catalyst 13 etc. The hydrocarbons which are adsorbed at the exhaust purification catalyst 13, as explained above, react with active $NO_X$ whereby reducing intermediates are generated. If the concentration of oxygen around the reducing intermediates becomes higher, the reducing intermediates react with the active $NO_X$ or oxygen or break down on their own whereby $NO_X$ is removed.

To use the first $NO_X$ removal method to remove $NO_X$ well, it is preferable to produce as much reducing intermediates as possible. The reducing intermediates are produced from radical state hydrocarbons, while the radical state hydrocarbons are produced from the hydrocarbons which were adsorbed at the exhaust purification catalyst. For this reason, to make the amount of production of reducing intermediates increase, it is preferable to make more hydrocarbons be adsorbed at the exhaust purification catalyst 13.

Figure 22:
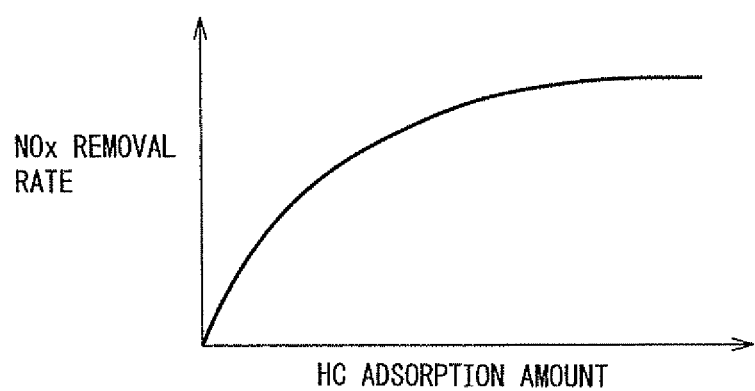
FIG. 22 is a graph of an $NO_X$ removal rate with respect to the amount of adsorption of hydrocarbons of the exhaust purification catalyst in the first $NO_X$ removal method.

FIG. 22 is a graph which explains the relationship between the amount of adsorption of hydrocarbons at the exhaust purification catalyst and the $NO_X$ removal rate when using the first $NO_X$ removal method to remove $NO_X$. It is learned that the greater the amount of adsorption of hydrocarbons of the exhaust purification catalyst 13, the higher the $NO_X$ removal rate becomes. However, the exhaust purification catalyst 13 has a saturated adsorption amount for when adsorbing hydrocarbons. When the amount of adsorption of hydrocarbons reaches the saturated adsorption amount, the hydrocarbons are not adsorbed and flow out from the exhaust purification catalyst.

Alternatively, the greater the amount of adsorption of hydrocarbons, the slower the speed of adsorption of hydrocarbons and the greater the amount of outflow of hydrocarbons from the exhaust purification catalyst. For example, if, in the state where the exhaust purification catalyst 13 has a large amount of hydrocarbons adsorbed at it, the concentration of oxygen which flows into the exhaust purification catalyst 13 rises or the temperature of the exhaust purification catalyst 13 rises, sometimes the adsorbed hydrocarbons desorb and hydrocarbons flow out from the exhaust purification catalyst 13.

Referring to FIG. 1, in the internal combustion engine of the present embodiment, the hydrocarbons which flow out from the exhaust purification catalyst 13 flow into the particulate filter 14. If hydrocarbons flow out from the exhaust purification catalyst 13, the hydrocarbons are oxidized at the particulate filter 14 and sometimes the temperature of the particulate filter 14 becomes higher than the allowable temperature or the hydrocarbons slip through the particulate filter 14 and white smoke is formed.

In the exhaust purification system of the present embodiment, the amount of adsorption of hydrocarbons which are adsorbed at the exhaust purification catalyst is estimated and the amount of adsorption of hydrocarbons is used as the basis for control to change the $NO_X$ removal rate. That is, control is performed to change the amount of feed of hydrocarbons and the feed interval of hydrocarbons which are fed to the exhaust purification catalyst.

Figure 23:
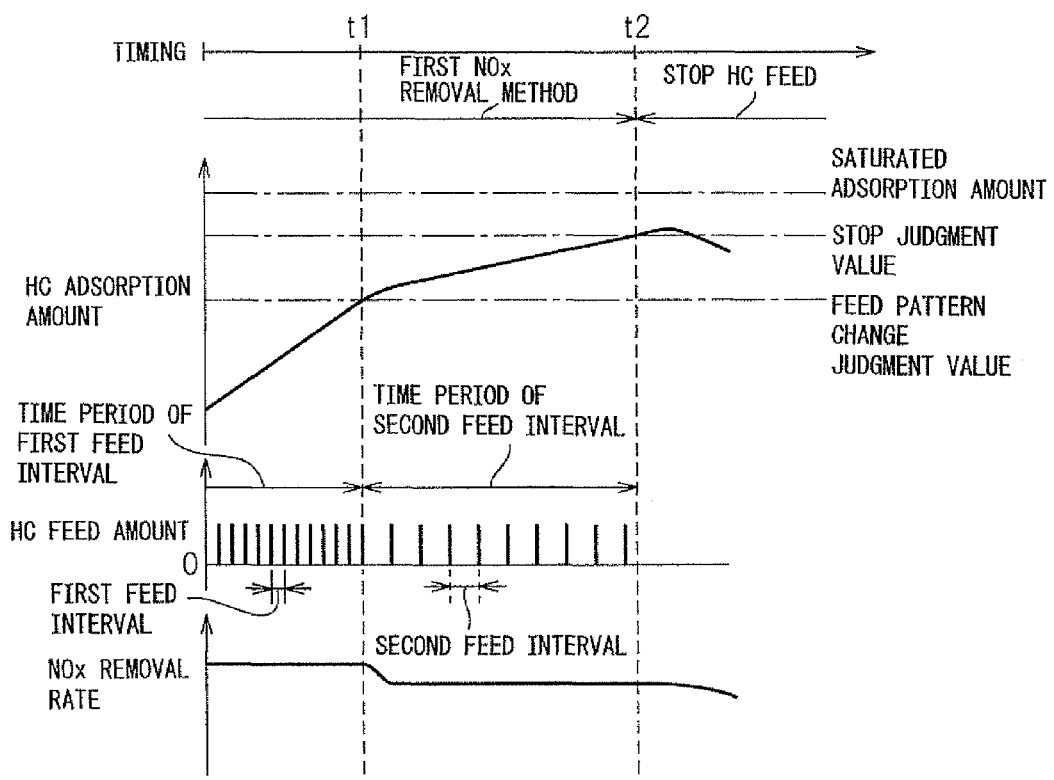
FIG. 23 is a time chart of first operational control in an embodiment.

FIG. 23 shows a time chart of first operational control of the exhaust purification system in the present embodiment. In the first operational control, the amount of adsorption of hydrocarbons which are adsorbed at the exhaust purification catalyst is estimated and the amount of adsorption of hydrocarbons is used as the basis for control to change at least one of the feed interval of hydrocarbons and the amount of feed of hydrocarbons within ranges enabling the first $NO_X$ removal method to be achieved. That is, the feed pattern of hydrocarbons is changed.

Up to the time t2, the first $NO_X$ removal method is used to remove the $NO_X$. Up to the time t1, the first feed amount and the first feed interval are used to feed hydrocarbons from the hydrocarbon feed valve 15. The individual amounts of feed of hydrocarbons up to the time t1 can be set by the map which is shown in the above-mentioned FIG. 16A. Further, the feed interval of hydrocarbons can be set by the map which is shown in FIG. 16B.

In the operation of the exhaust purification system, depending on the engine speed or load or other aspects of the operating state of the internal combustion engine, the ambient temperature of the surroundings, the fuel properties, etc., if continuing the first $NO_X$ removal method, sometimes the amount of adsorption of hydrocarbons of the exhaust purification catalyst will increase. In the example of operation which is shown in FIG. 23, the amount of feed of hydrocarbons is greater than the amount of consumption of hydrocarbons at the exhaust purification catalyst, so the amount of adsorption of hydrocarbons in the exhaust purification catalyst increases along with time.

In the internal combustion engine of the present embodiment, a feed pattern change judgment value for changing at least one of the feed interval of hydrocarbons and the amount of feed of hydrocarbons in a range enabling the first $NO_X$ removal method to be achieved is set in advance. Furthermore, a stop judgment value for stopping the feed of hydrocarbons is set in advance. The stop judgment value in the present embodiment is set to become larger than the feed pattern change judgment value. The stop judgment value in the present embodiment is set to be smaller than the upper limit by which the exhaust purification catalyst can adsorb hydrocarbons, that is, the saturated adsorption amount.

At the time t1, the amount of adsorption of hydrocarbons of the exhaust purification catalyst 13 reaches the feed pattern change judgment value. In the present embodiment, to suppress the outflow of hydrocarbons from the exhaust purification catalyst 13, control is performed to make the amount of feed of hydrocarbons decrease. In more detail, control is performed to reduce the amount of feed of hydrocarbons averaged per unit time. In the example of operation which is shown in FIG. 23, at the time t1, the individual amounts of feed of hydrocarbons are not changed, but control is performed to make the feed interval of hydrocarbons longer. From the time t1 on, the second feed amount and the second feed interval are used to feed hydrocarbons from the hydrocarbon feed valve 15. In the example of operation which is shown in FIG. 23, the second feed amount is the same as the first feed amount, and the second feed interval is set longer than the first feed interval.

In the example of operation which is shown in FIG. 23, at the time t1 and on, control is performed to make the feed interval of hydrocarbons longer whereby the speed of rise of the amount of adsorption of hydrocarbons of the exhaust purification catalyst falls. In this example of operation, at the time t1, even if making the feed interval of hydrocarbons longer, while the speed of rise becomes slower, the amount of adsorption of hydrocarbons increases. Further, while the removal rate of $NO_X$ in the exhaust purification catalyst 13 decreases, a high removal rate is maintained.

At the time t2, the amount of adsorption of hydrocarbons at the exhaust purification catalyst 13 reaches the stop judgment value. In this case, it is possible to judge that the amount of adsorption of hydrocarbons is approaching the saturated adsorption amount. For this reason, control is performed to stop the feed of hydrocarbons. That is, control is performed to increase the feed interval of hydrocarbons to infinite. In the present embodiment, at the time t2, control is performed to stop the feed of hydrocarbons from the hydrocarbon feed valve 15.

Even if stopping the feed of hydrocarbons from the hydrocarbon feed valve 15, the exhaust purification catalyst 13 has a large amount of hydrocarbons adsorbed on it, so even at the time t2 and on, the first $NO_X$ removal method can be used to produce reducing intermediates to remove the $NO_X$. Alternatively, the exhaust purification catalyst can store $NO_X$ to thereby remove $NO_X$ from the exhaust gas. At the time t2 and on, the amount of adsorption of hydrocarbons decreases. Along with the decrease in the amount of adsorption of hydrocarbons, the $NO_X$ removal rate is decreased, but the outflow of hydrocarbons from the exhaust purification catalyst 13 can be suppressed.

In this way, in the first operational control of the present embodiment, by changing the method of removal of $NO_X$ based on the amount of adsorption of hydrocarbons, it is possible to keep the amount of adsorption of hydrocarbons from becoming excessive. For example, it is possible to keep the amount of adsorption of hydrocarbons from rising to near the saturated adsorption amount. As a result, it is possible to suppress outflow of hydrocarbons from the exhaust purification catalyst.

At the time t2 and on, if the amount of adsorption of hydrocarbons falls to a predetermined resumption judgment value, it is possible to resume the feed of hydrocarbons from the hydrocarbon feed valve 15. For example, it is possible to set in advance a resumption judgment value which is smaller than the feed pattern change judgment value. If the amount of adsorption of hydrocarbons becomes less than the resumption judgment value, the first feed amount and first feed interval may be used to resume feed of hydrocarbons. Alternatively, when employing a resumption judgment value constituted by the feed pattern change judgment value and the amount of feed of hydrocarbons becomes less than the feed pattern change judgment value, the first feed amount and the first feed interval may be used to resume the feed of hydrocarbons.

In the example of operation which is shown in FIG. 23, at the time t1 on, by making the feed interval of hydrocarbons longer, the average amount of feed of hydrocarbons which is fed per unit time to the exhaust purification catalyst 13 is decreased, but the invention is not limited to this. It is also possible to decrease the individual amounts of feed of hydrocarbons so as to make the average amount of feed of hydrocarbons per unit time decrease. Alternatively, it is also possible to change both the feed interval of hydrocarbons and individual feed amounts of hydrocarbons.

Further, by changing the feed pattern of hydrocarbons at the time t1, sometimes the amount of adsorption of hydrocarbons of the exhaust purification catalyst decreases. In this case, when the amount of adsorption of hydrocarbons becomes less than the predetermined judgment value, control may be performed to increase the amount of feed of hydrocarbons. For example, control may be performed to return the feed pattern of the hydrocarbons to the first feed amount and first feed interval.

Figure 24:
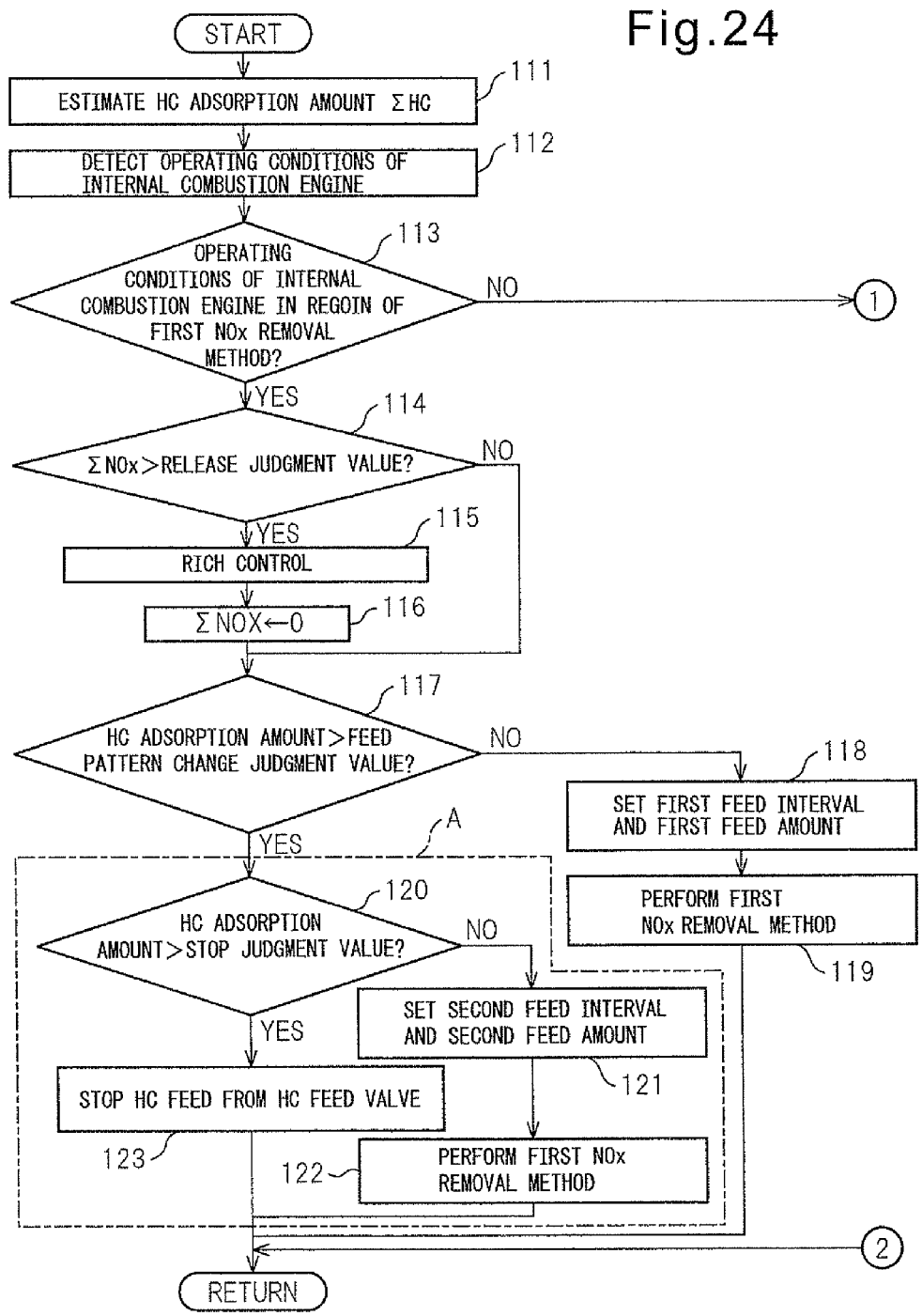
FIG. 24 is a flow chart of first operational control in an embodiment.
Figure 25:
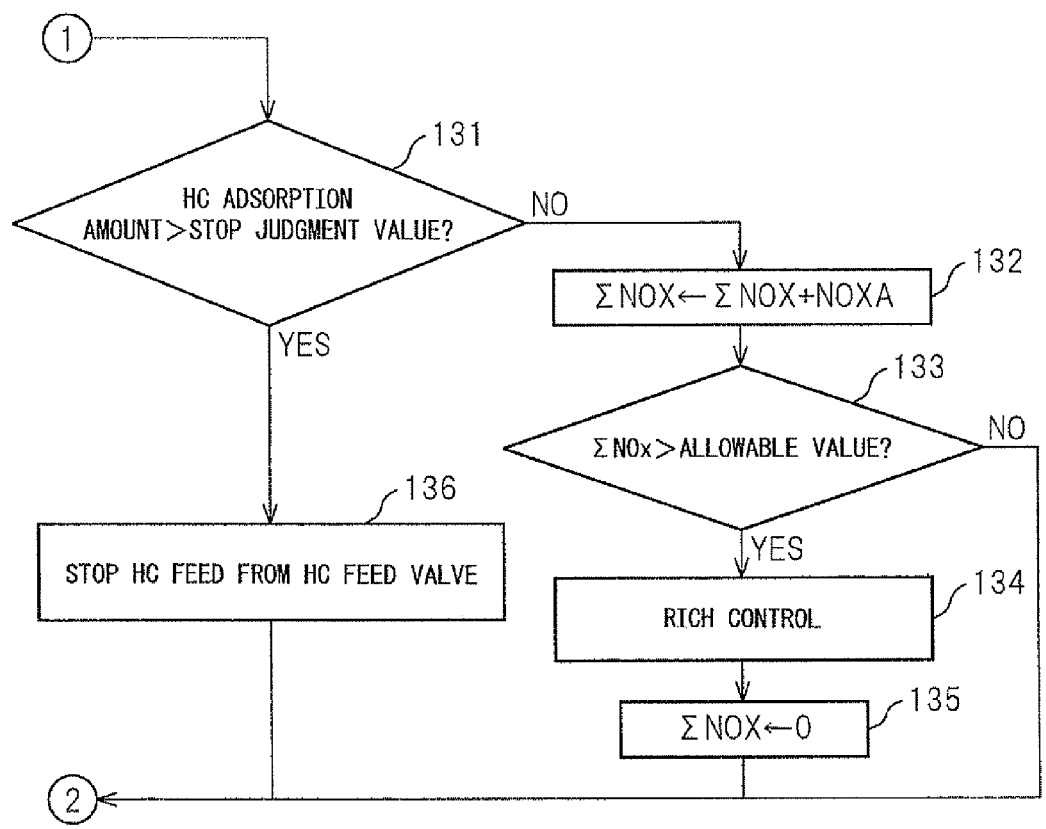
FIG. 25 is another flow chart of the first operational control in an embodiment.

FIG. 24 and FIG. 25 show a flow chart of first operational control of the exhaust purification system of the present embodiment. The operational control which is shown in FIG. 24 and FIG. 25 can be repeatedly performed at predetermined time intervals by for example interruption control.

At step 111, the amount of adsorption of hydrocarbons $\Sigma HC$ of the exhaust purification catalyst is estimated. In the present embodiment, the amount of adsorption of hydrocarbons is estimated every predetermined time interval and the estimated adsorption amount is stored in the electronic control unit 31. At step 111 of the present embodiment, control is performed to read the stored amount of adsorption of hydrocarbons, but the invention is not limited to this. At step 111, it is also possible to calculate the amount of adsorption of hydrocarbons.

Figure 26:
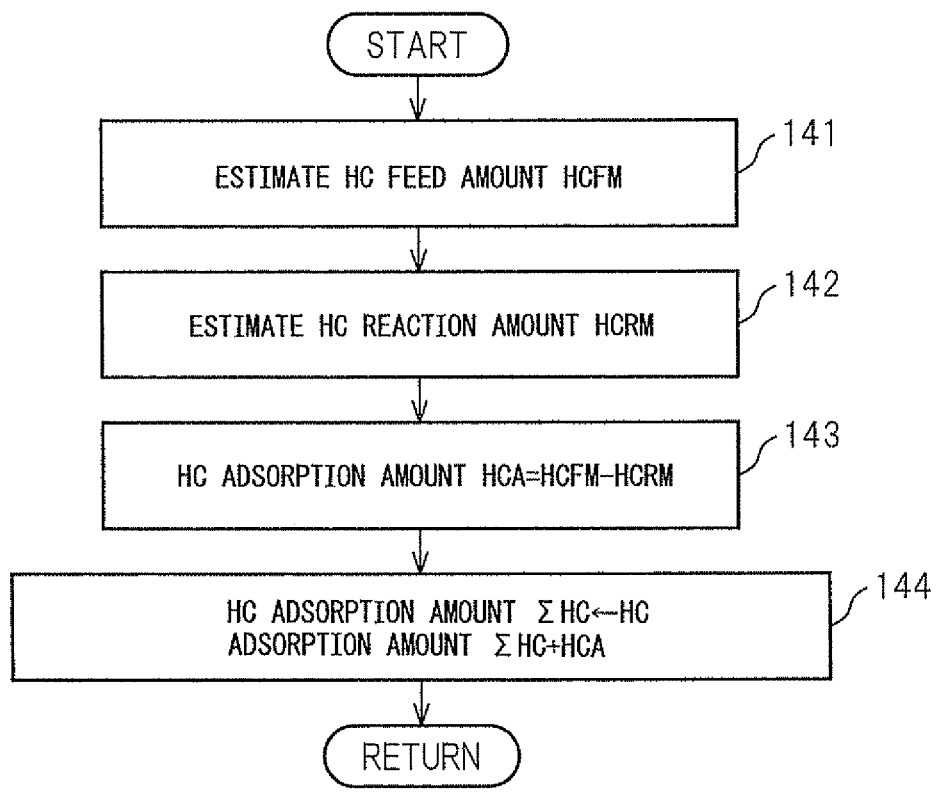
FIG. 26 is a flow chart of control for estimating the amount of adsorption of hydrocarbons of the exhaust purification catalyst.

FIG. 26 shows a flow chart of control which estimates the amount of adsorption of hydrocarbons. At step 141, the amount of feed of hydrocarbons HCFM in a predetermined time period is estimated. The amount of feed of hydrocarbons in the predetermined time period can be found by adding the amount of hydrocarbons which flows out from the combustion chambers 2 and the amount of hydrocarbons which is fed from the hydrocarbon feed valve 15. The amount of hydrocarbons which flows out from the combustion chambers 2 can, for example, be estimated by a map as a function of the engine speed N and the amount of injection Q of fuel from the fuel injectors 3. Further, the amount of feed of hydrocarbons from the hydrocarbon feed valve 15 can be calculated, for example, based on the feed amount which is set by the map such as shown in FIG. 16A.

At step 142, the reaction amount of hydrocarbons HCRM at the exhaust purification catalyst 13 in a predetermined time period is estimated. The reaction amount of hydrocarbons in the exhaust purification catalyst 13 can be estimated based on the amount of $NO_X$ which flows into the exhaust purification catalyst 13, the flow rate of the inflowing exhaust gas, the temperature of the exhaust purification catalyst 13, etc.

Figure 27:
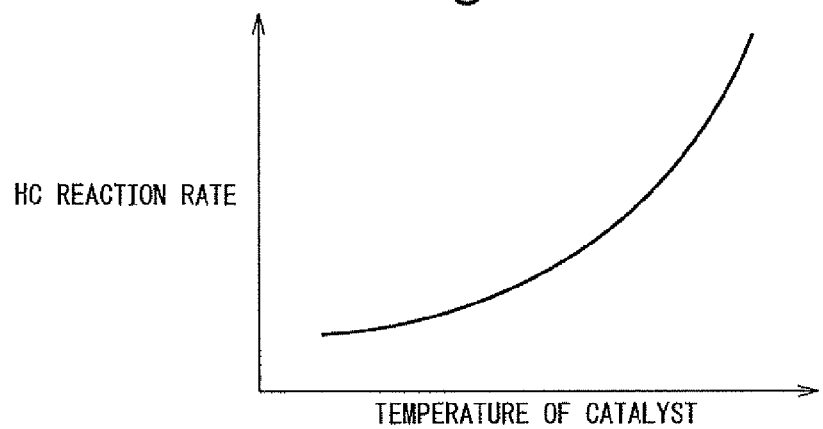
FIG. 27 is a graph of the reaction rate of hydrocarbons with respect to the temperature of the exhaust purification catalyst.
Figure 28:
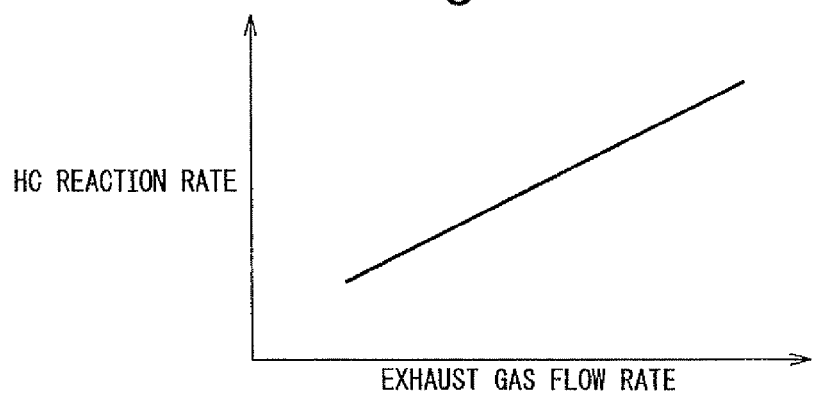
FIG. 28 is a graph of the reaction rate of hydrocarbons with respect to the flow rate of gas which flows into the exhaust purification catalyst.

FIG. 27 shows a graph which shows the relationship between the temperature of the exhaust purification catalyst and the reaction rate of hydrocarbons (amount of reaction per unit time). It is learned that the higher the exhaust purification catalyst 13 in temperature, the more the reaction rate of the hydrocarbons rises. FIG. 28 shows a graph which explains the relationship between the flow rate of the exhaust gas in an exhaust purification catalyst and the reaction rate of hydrocarbons. It is learned that the greater the flow rate of the exhaust gas which flows through the exhaust purification catalyst 13, the more the reaction rate of the hydrocarbons rises. The flow rate of the exhaust gas which flows through the exhaust purification catalyst 13 can, for example, be estimated from the output of the intake air detector 8 which is arranged in the engine intake passage. The temperature of the exhaust purification catalyst 13 can be estimated, for example, from the output of the temperature sensor 23. The amount of $NO_X$ which flows into the exhaust purification catalyst 13 can, for example, as shown in FIG. 18, be estimated by a map as a function of the engine speed N and the amount of injection Q of fuel from the fuel injectors 3.

The above reaction rate of hydrocarbons can be stored in advance in the electronic control unit 31 as a function of the amount of $NO_X$ which flows into the exhaust purification catalyst 13, the flow rate of the exhaust gas, and the temperature of the exhaust purification catalyst 13.

Figure 29:
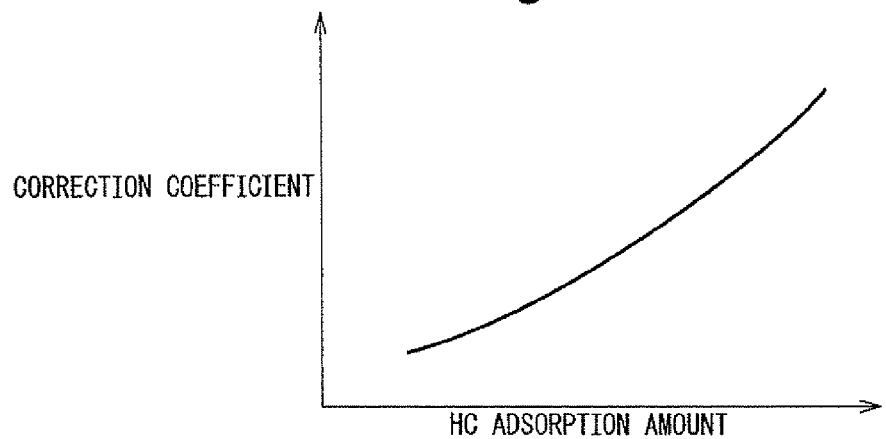
FIG. 29 is a graph which explains a correction coefficient for calculating the reaction rate of hydrocarbons with respect to the amount of adsorption of hydrocarbons.

FIG. 29 shows a graph of the correction coefficient of the reaction rate of hydrocarbons with respect to the amount of adsorption of hydrocarbons. The reaction amount of hydrocarbons, as explained above, depends on the amount of adsorption of hydrocarbons of the exhaust purification catalyst. For example, even if the temperature of the exhaust purification catalyst, the flow rate of the exhaust gas, etc. are the same, the greater the amount of adsorption of hydrocarbons, the more the reaction rate rises. When setting a correction coefficient for calculation of the reaction rate of hydrocarbons, the greater the amount of adsorption of hydrocarbons, the larger the correction coefficient of the reaction rate of hydrocarbons that can be set. For example, it is possible to set in advance a correction coefficient as a function of the amount of adsorption of hydrocarbons and perform correction by multiplying the calculated reaction rate of hydrocarbons by the correction coefficient.

Referring to FIG. 26, next, at step 143, the amount of adsorption of hydrocarbons HCA in a predetermined time period is estimated. The amount of adsorption of hydrocarbons HCA can be estimated by subtracting the reaction amount of hydrocarbons HCRM from the amount of feed of hydrocarbons HCFM. Further, at step 143, it is possible to subtract the desorbed amount of hydrocarbons. For example, if the temperature of the exhaust purification catalyst 13 becomes a predetermined desorption temperature or more, hydrocarbons are desorbed. In the temperature region of the desorption temperature or more, the higher the temperature of the exhaust purification catalyst 13, the greater the amount of desorption. For example, it is possible to use the temperature of the exhaust purification catalyst 13 and the amount of adsorption of hydrocarbons as the basis to estimate the desorbed amount and subtract the desorbed amount when estimating the amount of adsorption of hydrocarbons HCA.

Next, at step 144, the current amount of adsorption of hydrocarbons $\Sigma HC$ is estimated. The current amount of adsorption of hydrocarbons $\Sigma HC$ can be estimated by adding the current amount of adsorption of hydrocarbons HCA which was calculated at step 143 to the previous amount of adsorption of hydrocarbons $\Sigma HC$. In this way, it is possible to estimate the amount of adsorption of hydrocarbons which are adsorbed at the exhaust purification catalyst at any timing. Note that, the estimation of the amount of adsorption of hydrocarbons at step 111 is not limited to this. It may be performed by any control.

Referring to FIG. 24, next, at step 112, the operating state of the internal combustion engine is detected. In the present embodiment, to select the $NO_X$ removal method, the engine speed and load of the internal combustion engine are detected.

Next, at step 113, it is judged if the operating state of the internal combustion engine is in the region of the first $NO_X$ removal method or the region of the second $NO_X$ removal method. Referring to FIG. 21, the engine speed and load can be used as the basis to select the first $NO_X$ removal method or the second $NO_X$ removal method. When, at step 113, the operating state of the internal combustion engine is in the operating region for performing the first $NO_X$ removal method, the routine proceeds to step 114.

In this regard, due to the previous first operational control, sometimes the exhaust purification system is performing the second $NO_X$ removal method. In this case, the basic layer 53 of the exhaust purification catalyst stores $NO_X$. In the present embodiment, control is performed to release the $NO_X$ which is stored in the basic layer 53 when switching from the second $NO_X$ removal method to the first $NO_X$ removal method. At step 114, step 115, and step 116, control is performed to release $NO_X$.

Figure 30:
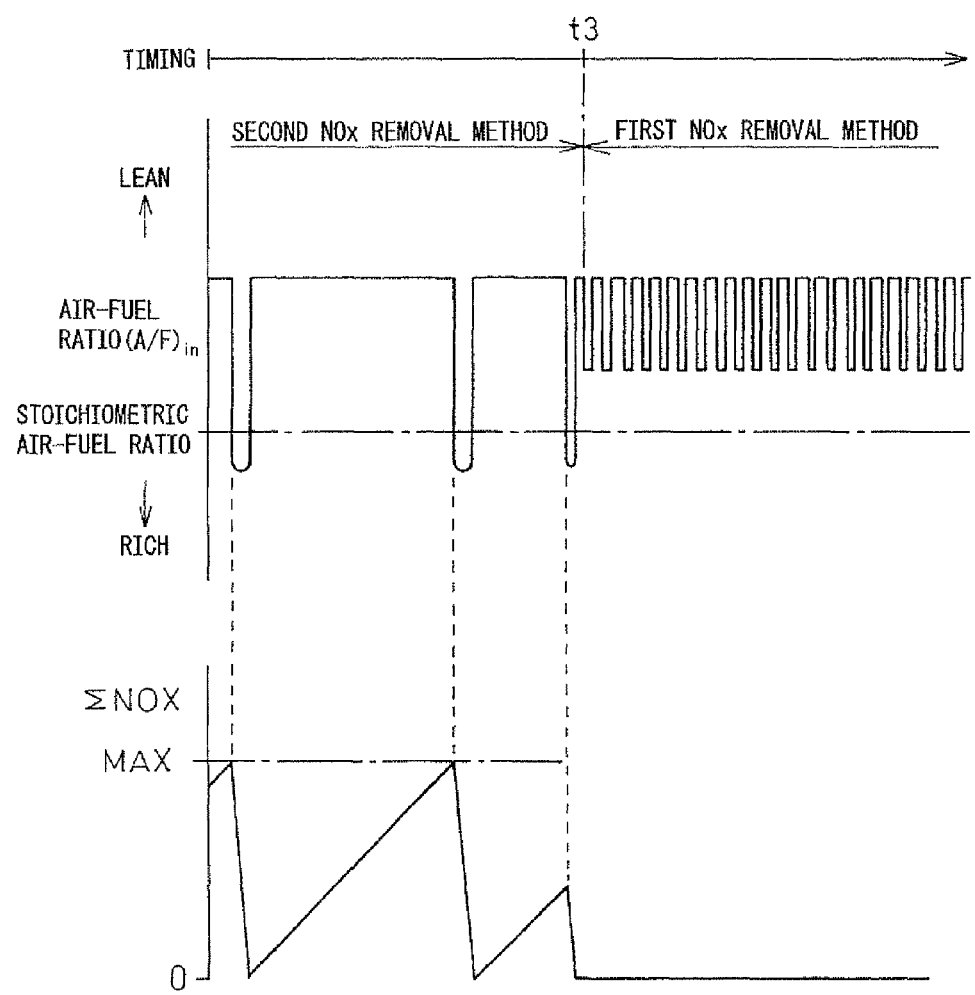
FIG. 30 is a time chart of an example of operation when switching from the second $NO_X$ removal method to the first $NO_X$ removal method.

FIG. 30 shows a time chart of an example of operation when switching from the second $NO_X$ removal method to the first $NO_X$ removal method. At the time t3, the $NO_X$ removal method is changed from the second $NO_X$ removal method to the first $NO_X$ removal method. In this example of operation, the method is switched at the time t3 after the elapse of a predetermined time from when the exhaust gas is made rich in air-fuel ratio and $NO_X$ is released. For this reason, at the time t3, the exhaust purification catalyst stores a predetermined amount of $NO_X$. In the present embodiment, when switching the $NO_X$ removal method, control is performed to release the $NO_X$ which is stored in the exhaust purification catalyst. By releasing the $NO_X$, the amount of $NO_X$ which is stored in the basic layer becomes zero.

Referring to FIG. 24, at step 114, it is judged if the $NO_X$ storage amount $\Sigma NO_X$ is larger than a predetermined release judgment value. The release judgment value at this time is the minimum $NO_X$ storage amount when releasing $NO_X$. If, at step 114, the $NO_X$ storage amount $\Sigma NO_X$ is the release judgment value or less, the routine proceeds to step 117. If the $NO_X$ storage amount $\Sigma NO_X$ is larger than the release judgment value, the routine proceeds to step 115.

At step 115, rich control is performed so that the exhaust gas which flows into the $NO_X$ exhaust purification catalyst 13 becomes rich in air-fuel ratio. By performing this rich control, $NO_X$ can be made to be released from the exhaust purification catalyst 13. At step 116, the $NO_X$ storage amount $\Sigma NO_X$ is made zero.

In this way, in the present embodiment, after releasing the $NO_X$ which is stored in the exhaust purification catalyst 13, the first $NO_X$ removal method is used to remove the $NO_X$, but the invention is not limited to this. Step 114 to step 116 need not be performed.

Next, at step 117, it is judged if the amount of adsorption of hydrocarbons $\Sigma HC$ of the exhaust purification catalyst 13 is larger than the feed pattern change judgment value. If the amount of adsorption of hydrocarbons is the feed pattern change judgment value or less, the routine proceeds to step 118. In this case, referring to FIG. 23, it is possible to judge that there is an extra margin in the amount of adsorption of hydrocarbons. At step 118, the first feed amount and the first feed interval are set as the feed pattern of hydrocarbons in the first $NO_X$ removal method. The first feed amount and first feed interval can be set by the maps such as shown in, for example, FIG. 16A and FIG. 16B.

Next, at step 119, the set first feed amount and first feed interval are used as the basis to perform the first $NO_X$ removal method. When already performing a similar first $NO_X$ removal method, control is performed to continue this.

When, at step 117, the amount of adsorption of hydrocarbons is larger than the feed pattern change judgment value, the routine proceeds to step 120. At step 120, it is judged if the amount of adsorption of hydrocarbons is larger than a stop judgment value. If the amount of adsorption of hydrocarbons is the stop judgment value or less, the routine proceeds to step 121. In this case, the amount of adsorption of hydrocarbons of the exhaust purification catalyst is larger than the feed pattern change judgment value and not more than the stop judgment value. Referring to FIG. 23, in this case, control is performed to reduce the amount of feed of hydrocarbons.

At step 121, the second feed amount and the second feed interval are set to feed hydrocarbons from the hydrocarbon feed valve 15. The second feed amount and the second feed interval are set so that the average amount of feed of hydrocarbons which is fed per unit time becomes smaller than with the first feed amount and first feed interval. The second feed amount and the second feed interval can, for example, be set corrected to the values set by maps such as shown in FIG. 16A and FIG. 16B.

Next, at step 122, the set second feed amount and second feed interval are used as the basis to perform the first $NO_X$ removal method.

When, at step 120, the amount of adsorption of hydrocarbons is larger than the stop judgment value, the routine proceeds to step 123. In this case, referring to FIG. 23, it is possible to judge that the state is one where the amount of adsorption of hydrocarbons of the exhaust purification catalyst 13 is approaching the saturated adsorption amount.

For this reason, at step 123, control is performed to stop the feed of hydrocarbons from the hydrocarbon feed valve 15. By stopping the feed of hydrocarbons from the hydrocarbon feed valve 15, it is possible to avoid the amount of adsorption of hydrocarbons at the exhaust purification catalyst exceeding the saturated adsorption amount. In this way, in the operating region of the first $NO_X$ removal method, the $NO_X$ removal method can be changed.

On the other hand, when, at step 113, the operating state of the internal combustion engine is not in the region of the first $NO_X$ removal method, the routine proceeds to step 131 of FIG. 25. In this case, referring to FIG. 21, the operating state of the internal combustion engine is inside the region of the second $NO_X$ removal method.

At step 131, it is judged if the amount of adsorption of hydrocarbons of the exhaust purification catalyst 13 exceeds the stop judgment value. When, at step 131, the amount of adsorption of hydrocarbons exceeds the stop judgment value, the routine proceeds to step 136. At step 136, the feed of hydrocarbons from the hydrocarbon feed valve 15 is stopped.

When, at step 131, the amount of adsorption of hydrocarbons of the exhaust purification catalyst 13 is the stop judgment value or less, the routine proceeds to step 132. In this case, the second $NO_X$ removal method is performed. At step 132, the $NO_X$ amount NOXA which flows into the purification catalyst is estimated and the current stored $NO_X$ amount $\Sigma NO_X$ of the exhaust purification catalyst is calculated.

Next, at step 133, it is judged if the stored $NO_X$ amount $\Sigma NO_X$ of the exhaust purification catalyst is larger than the allowable value MAX. If the $NO_X$ storage amount $\Sigma NO_X$ of the exhaust purification catalyst is the allowable value MAX or less, the current control is ended. That is, control is performed to continue the storage of $NO_X$. When, at step 133, the $NO_X$ storage amount $\Sigma NO_X$ of the exhaust purification catalyst 13 is larger than the allowable value MAX, the routine proceeds to step 134.

At step 134, control is performed to make the air-fuel ratio of the exhaust gas which flows into the exhaust purification catalyst 13 rich. In the present embodiment, control is performed which performs auxiliary injection after main injection in the combustion chambers 2 so as to make the exhaust gas which flows into the exhaust purification catalyst 13 rich in air-fuel ratio. From the basic layer 53 of the exhaust purification catalyst 13, $NO_X$ is released and reduced. Next, at step 135, the $NO_X$ storage amount $\Sigma NO_X$ of the exhaust purification catalyst 13 is made zero to reset it.

In this way, in the exhaust purification system of an internal combustion engine of the present embodiment, during the time period when the first $NO_X$ removal method is being performed, the amount of adsorption of hydrocarbons is estimated. When the estimated amount of adsorption of hydrocarbons exceeds a predetermined judgment value of the adsorption amount, at least one control of control which reduces the amount of feed of hydrocarbons and control which extends the feed interval of hydrocarbons is performed. By performing this control, it is possible to suppress the outflow of hydrocarbons from the exhaust purification catalyst and, further, remove the $NO_X$ by a high $NO_X$ removal rate.

In the first operational control which is shown from FIG. 23 to FIG. 25, control is performed to decrease the amount of feed of hydrocarbons the greater the amount of adsorption of hydrocarbons. In the first operational control, a single feed pattern change judgment value is provided to change the amount of feed of hydrocarbons, but the invention is not limited to this. It is also possible to set two or more feed pattern change judgment values. Further, it is possible to set two or more feed pattern change judgment values and change the average amount of feed of hydrocarbons fed per unit time to the exhaust purification catalyst in stages. Alternatively, it is possible to estimate the amount of adsorption of hydrocarbons and to change the amount of feed of hydrocarbons continuously in accordance with the amount of adsorption of hydrocarbons.

Next, the second operational control in the present embodiment will be explained. In the first operational control, when the amount of adsorption of hydrocarbons of the exhaust purification catalyst exceeds a predetermined judgment value, control is performed to change the amount of feed of hydrocarbons in the first $NO_X$ removal method. In the second operational control, if, during the time period when the first $NO_X$ removal method is being performed, the amount of adsorption of hydrocarbons of the exhaust purification catalyst exceeds a predetermined judgment value, control is performed to switch to the second $NO_X$ removal method.

Figure 31:
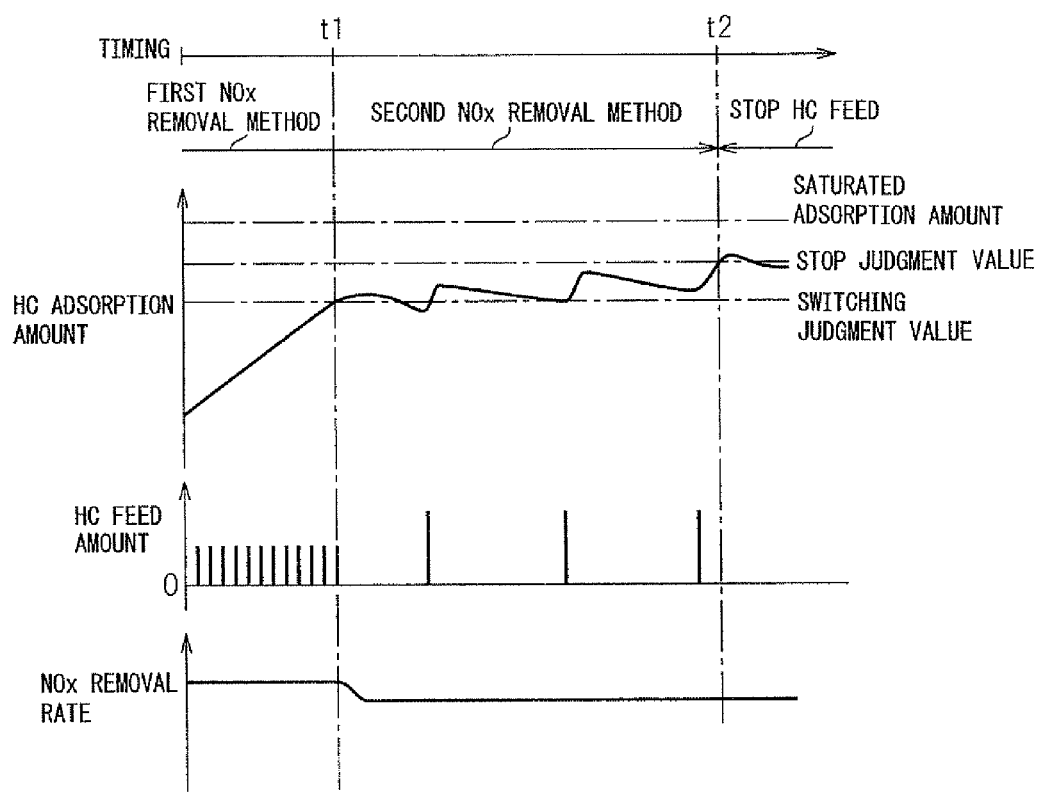
FIG. 31 is a time chart of second operational control in an embodiment.

FIG. 31 shows a time chart of the second operational control in the present embodiment. Up to the time t1, the first $NO_X$ removal method is used to remove the $NO_X$. In the second operational control, the switching judgment value and stop judgment value relating to the amount of adsorption of hydrocarbons of the exhaust purification catalyst are determined in advance. The switching judgment value is the judgment value for switching the $NO_X$ removal method. A judgment value which is smaller than the stop judgment value is employed.

In the example of operation which is shown in FIG. 31 as well, by performing the first $NO_X$ removal method up to the time t1, the amount of adsorption of hydrocarbons of the exhaust purification catalyst 13 continuously increases. The amount of adsorption of hydrocarbons of the exhaust purification catalyst 13 reaches the switching judgment value at the time t1. At the time t1, control is performed to switch the $NO_X$ removal method from the first $NO_X$ removal method to the second $NO_X$ removal method.

The second $NO_X$ removal method is a removal method which stores, releases, and reduces $NO_X$. The feed interval of the hydrocarbons becomes longer than in the first $NO_X$ removal method. If performing the second $NO_X$ removal method from the state of a large amount of adsorption of hydrocarbons, in most cases, the amount of adsorption of hydrocarbons will decrease along with continuation of operation. In this regard, sometimes the amount of adsorption of hydrocarbons of the exhaust purification catalyst 13 increases in accordance with the amount of feed of hydrocarbons in the second $NO_X$ removal method and the operating state of the internal combustion engine etc. In the second operational control of the present embodiment, the case where even after switching to the second $NO_X$ removal method, the maximum value of the amount of adsorption of hydrocarbons gradually rises will be taken up as an example for the explanation.

The amount of adsorption of hydrocarbons of the exhaust purification catalyst 13 increases each time performing rich control which makes the exhaust gas rich in air-fuel ratio. After that, the amount of adsorption of hydrocarbons decreases. Each time repeating the rich control, the maximum value of the amount of adsorption of hydrocarbons gradually rises. At the time t2, the amount of adsorption of hydrocarbons of the exhaust purification catalyst reaches the stop judgment value.

In the second operational control of the present embodiment, when, during the time period when the second $NO_X$ removal method is being performed, the amount of adsorption of hydrocarbons of the exhaust purification catalyst exceeds the stop judgment value, control is performed to stop the feed of hydrocarbons. That is, at the time t2 and on, the amount of feed of hydrocarbons from the hydrocarbon feed valve 15 is made zero.

By making the amount of feed of hydrocarbons zero, the amount of adsorption of hydrocarbons is decreased from the time t2 on. In the second operational control as well, it is possible to set in advance a resumption judgment value which resumes the feed of hydrocarbons by the first $NO_X$ removal method or the feed of hydrocarbons by the second $NO_X$ removal method. When the amount of adsorption of hydrocarbons is less than a predetermined resumption judgment value, it is possible to resume the feed of hydrocarbons from the hydrocarbon feed valve 15 so as to perform the first $NO_X$ removal method or the second $NO_X$ removal method.

Figure 32:
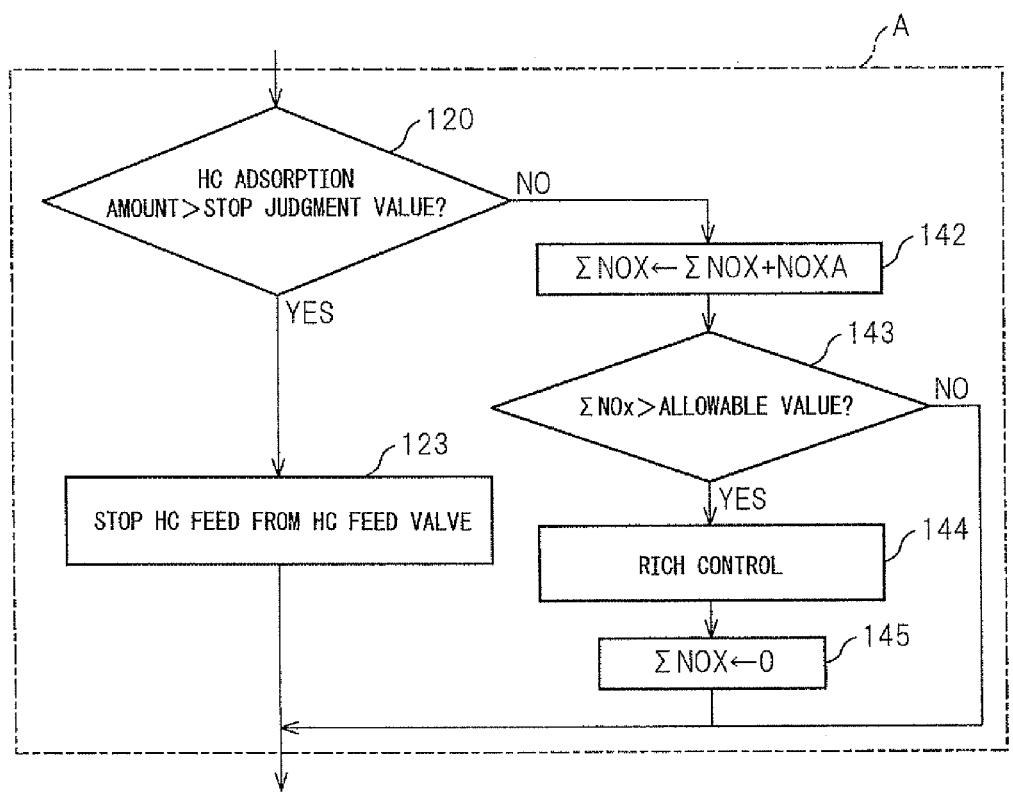
FIG. 32 is part of a flow chart of the second operational control in an embodiment.

FIG. 32 shows part of a flow chart of the second operational control of the present embodiment. The second operational control is similar to the first operational control which is shown in FIG. 24 and FIG. 25 in the majority of the steps. FIG. 32 shows the part which is surrounded by the range A of FIG. 24. In the second operational control, the parts of step 121 and step 122 of the first operational control of FIG. 24 are different.

Referring to FIG. 32, FIG. 24, and FIG. 25, at step 120, if the amount of adsorption of hydrocarbons is the stop judgment value or less, the routine proceeds to step 142 where the second $NO_X$ removal method is performed. Step 142 to step 145 are similar to step 132 to step 135 in FIG. 25. In this way, in the second operational control, if the amount of adsorption of hydrocarbons is smaller than a predetermined switching judgment value, the first $NO_X$ removal method is performed, while if the amount of adsorption of hydrocarbons is larger than the predetermined switching judgment value, the second $NO_X$ removal method can be employed.

In the second operational control, even when the operating state of the internal combustion engine is in the region where the first $NO_X$ removal method is performed, if the amount of adsorption of hydrocarbons exceeds the switching judgment value, control is performed to switch from the first $NO_X$ removal method to the second $NO_X$ removal method. That is, control is performed to make the feed interval of hydrocarbons longer.

In the example of operation which is shown in FIG. 31, even in the second $NO_X$ removal method, the maximum value of the amount of adsorption of hydrocarbons gradually rises. On the other hand, when, by switching to the second $NO_X$ removal method, the amount of adsorption of hydrocarbons gradually decreases, similar control to the control from the above time t2 and on may be performed. That is, it is possible to set in advance a judgment value for resumption of the feed of hydrocarbons by the first $NO_X$ removal method and to resume the first $NO_X$ removal method when the amount of adsorption of hydrocarbons is less than the predetermined judgment value.

By performing the second operational control in the present embodiment as well, it is possible to remove $NO_X$ by a higher removal rate and to suppress the outflow of hydrocarbons from the exhaust purification catalyst.

The above first operational control and second operational control can be suitably combined. For example, the feed pattern change judgment value, the switching judgment value, and the stop judgment value can be set in advance to change the method of removal of $NO_X$. For example, the stop judgment value can be set smaller than the saturated adsorption amount. The switching judgment value can be set smaller than the stop judgment value. The feed pattern change judgment value can be set smaller than the switching judgment value.

When, during the time period when the first $NO_X$ removal control is being performed, the amount of adsorption of hydrocarbons exceeds the feed pattern change judgment value, control may be performed to decrease the average amount of feed of hydrocarbons per unit time which is fed to the exhaust purification catalyst. Further, when the amount of adsorption of hydrocarbons exceeds the switching judgment value, control may be performed to switch from the first $NO_X$ removal method to the second $NO_X$ removal method. Furthermore, it is possible to stop the feed of hydrocarbons if the amount of adsorption of hydrocarbons exceeds the stop judgment value. Alternatively, in the region where the amount of adsorption of hydrocarbons is the switching judgment value or less, control may be performed to decrease the average amount of feed of hydrocarbons per unit time which is fed to the exhaust purification catalyst the greater the amount of adsorption of hydrocarbons.

By performing such multistage control which combines the first operational control and the second operational control, it is possible to maintain the $NO_X$ removal rate higher and more reliably suppress outflow of hydrocarbons from the exhaust purification catalyst.

Note that in the above control routines, the order of the steps may be suitably changed within a range not changing the actions and functions. In the above figures, the same or equivalent parts are assigned the same reference notations. Note that the above embodiments are illustrative and do not limit the invention. Further, the embodiments include changes which are shown in the claims.

REFERENCE SIGNS LIST 5 exhaust manifold
8 intake air detector
12 exhaust pipe
13 exhaust purification catalyst
14 particulate filter
15 hydrocarbon feed valve
23 temperature sensor
30 electronic control unit
50 catalyst carrier
51, 52 precious metal catalyst
53 basic layer
54 exhaust gas flow surface part

The invention claimed is:
1. An exhaust purification system of an internal combustion engine comprising:
an engine exhaust passage;
a hydrocarbon feed valve for feeding hydrocarbons;
an exhaust purification catalyst for causing $NO_X$ that is contained in exhaust gas and reformed hydrocarbons to react arranged downstream of the hydrocarbon feed valve in the engine exhaust passage;
precious metal catalysts carried on an exhaust gas flow surface of the exhaust purification catalyst;
a basic exhaust gas flow surface part formed around the precious metal catalysts; and
an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
when the electronic control unit controls the vibration of the concentration of hydrocarbons flowing into the exhaust purification catalyst within the predetermined range of amplitude and within the predetermined range of period, a reducing intermediate containing nitrogen and hydrocarbons is produced on the precious metal catalysts and held on the basic exhaust gas flow surface part, the $NO_X$ contained in the exhaust gas catalyst is chemically reduced by the reducing intermediate held on the basic exhaust gas flow surface part in the exhaust purification catalyst, and the exhaust purification catalyst has a property of chemically reducing the $NO_X$ that is contained in the exhaust gas without storing, or storing a fine amount of nitrates in the basic exhaust gas flow surface part,
when the electronic control unit controls the vibration period of the hydrocarbon concentration longer than the predetermined range of period, the exhaust purification catalyst has a property of being increased in a storage amount of $NO_X$ that is contained in the exhaust gas,
the electronic control unit is further figured to control an injection amount of hydrocarbons from the hydrocarbon feed valve such that the amplitude of a change of concentration of hydrocarbons that flow into the exhaust purification catalyst becomes within the predetermined range of amplitude, and is further configured to control a feed interval of hydrocarbons from the hydrocarbon feed valve such that the concentration of hydrocarbons that flow into the exhaust purification catalyst vibrates within the predetermined range of period, and
when the electronic control unit is controlling the injection amount and the feed interval of hydrocarbons from the hydrocarbon feed valve such that the amount of hydrocarbons is within the predetermined range of amplitude and within the predetermined range of period, the electronic control unit is further configured to estimate an amount of hydrocarbons adsorbed in the exhaust purification catalyst based on an operating state of the engine, and, if the estimated amount of adsorbed hydrocarbons exceeds a predetermined value, the electronic control unit is configured to control the feed amount of hydrocarbons such that feed amount of hydrocarbons is reduced, and is configured to control the feed interval of hydrocarbons such that the feed interval is lengthened.

2. The exhaust purification system of an internal combustion engine as set forth in claim 1, wherein
when the electronic control unit is controlling the vibration of the concentration of hydrocarbons flowing into the exhaust purification catalyst within the predetermined range of amplitude and within the predetermined range of period, if the amount of adsorption of hydrocarbons in the exhaust purification catalyst exceeds a predetermined switching judgment value, the electronic control unit switches to controlling the vibration period of the hydrocarbon concentration to longer than the predetermined range of period.

3. The exhaust purification system of an internal combustion engine as set forth in claim 1, wherein when the amount of adsorption of hydrocarbons in the exhaust purification catalyst exceeds a predetermined feed pattern change judgment value, the electronic control unit is configured to cause the feed amount of hydrocarbons to become smaller, and is configured to control the feed interval of hydrocarbons to become longer, than the predetermined range of amplitude and the predetermined range of period.

4. The exhaust purification system of an internal combustion engine as set forth in claim 1, wherein
when the electronic control unit is controlling the vibration of the concentration of hydrocarbons flowing into the exhaust purification catalyst within the predetermined range of amplitude and within the predetermined range of period, the greater the amount of adsorption of hydrocarbons in the exhaust purification catalyst becomes, the electronic control unit is configured to more frequently cause the feed amount of hydrocarbons to become smaller and to more frequently cause the feed interval of hydrocarbons to become longer than the predetermined range of amplitude and the predetermined range of period,
when the amount of adsorbed hydrocarbons in the exhaust purification catalyst exceeds a predetermined switching judgment value, the electronic control unit is further configured to switch from controlling the vibration of the concentration of hydrocarbons flowing into the exhaust purification catalyst within the predetermined range of amplitude and within the predetermined range of period to controlling the vibration period of the hydrocarbon concentration longer than the predetermined range of period, and
when the amount of adsorbed of hydrocarbons in the exhaust purification catalyst exceeds a predetermined stop judgment value, the electronic control unit is further configured to cause the feeding of hydrocarbons from the hydrocarbon feed valve to stop.

* * * * *